(12) United States Patent
Satoh et al.

(10) Patent No.: US 6,327,600 B1
(45) Date of Patent: *Dec. 4, 2001

(54) DETERMINING COPYRIGHT INFORMATION BASED ON OVERLAPPING INFORMATION BETWEEN PORTIONS OF TWO DOCUMENTS

(75) Inventors: Kenji Satoh; Akitoshi Okumura; Takahiro Ikeda, all of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/078,718

(22) Filed: May 14, 1998

(30) Foreign Application Priority Data

May 14, 1997 (JP) .................................................. 9-139358

(51) Int. Cl.[7] .................................................. G06F 12/14
(52) U.S. Cl. ........................... 707/530; 707/500; 707/513
(58) Field of Search .................................. 707/501, 513, 707/530, 500

(56) References Cited

U.S. PATENT DOCUMENTS

| | | | | |
|---|---|---|---|---|
| 5,428,529 | * | 6/1995 | Hatrick et al. ........................ | 707/513 |
| 5,444,779 | * | 8/1995 | Daniele ................................ | 399/666 |
| 5,572,643 | * | 11/1996 | Judson ................................ | 709/218 |
| 5,737,619 | * | 4/1998 | Judson ................................ | 707/500 |
| 5,754,308 | * | 5/1998 | Lopresti et al. ..................... | 358/403 |
| 5,765,152 | * | 6/1998 | Erickson .................................. | 707/9 |
| 5,842,023 | * | 11/1998 | Tsumura .............................. | 395/712 |
| 5,890,171 | * | 3/1999 | Blumer et al. ....................... | 707/501 |
| 5,987,127 | * | 11/1999 | Ikenoue et al. .......................... | 380/7 |
| 5,987,607 | * | 11/1999 | Tsumura .............................. | 713/200 |

FOREIGN PATENT DOCUMENTS

| | | |
|---|---|---|
| 2-266445 | 10/1990 | (JP) . |
| 3-154137 | 7/1991 | (JP) . |

(List continued on next page.)

OTHER PUBLICATIONS

Managing Innovation, Irish, V., Engineering Management Journal, 10/92, p 213–216.*

Primary Examiner—Heather R. Herndon
Assistant Examiner—Cesar B. Paula
(74) Attorney, Agent, or Firm—Sughrue, Mion, Zinn, Macpeak & Seas, PLLC

(57) ABSTRACT

A document management system is provided to manage electronic documents in connection with copyrights. Herein, copyright management information is set with respect to a constituent element of a document that a user produces. The constituent element corresponds to a chapter, a paragraph, a sentence, a figure or a table, for example. The copyright management information represents copyright information regarding the use of the document, which is classified into prescribed levels such as a reference level, a copy level and a print level. In addition, it represents prescribed conditions as to whether the use of the document is allowed with payment of fee, with filing of application and with display of copyright or not, for example. Further, the content of the copyright management information can be changed in response to user levels respectively. The copyright management information is connected with information representing the constituent element. When the user requests to use a prescribed portion of another document other than the document that the user is presently producing, a use-allowed part is determined within the prescribed portion on the basis of the copyright management information of the constituent element overlapping with the prescribed portion. So, the user is capable of making a decision whether to actually use the use-allowed part in consideration of the prescribed conditions.

6 Claims, 22 Drawing Sheets

| ID | TITLE OF DOCUMENT | WRITER | APPLICATION -FILED USER | RANGE INFORMATION 1 | | | ... |
|---|---|---|---|---|---|---|---|
| 1 | HIGH-SPEED FULL TEXT SEARCH SYSTEM RETRIEVAL EXPRESS | TORU AKAMINE | | CHARACTERS 1-48 | | | |
| | | | | REFERENCE ALLOWED COPY ALLOWED PRINT ALLOWED DEPARTMENT DIRECTOR OR HIGHER POSITION | REFERENCE ALLOWED COPY DISALLOWED PRINT DISALLOWED SECTION CHIEF OR LOWER POSITION | | ... |
| 2 | OCR TEXT SEARCH SYSTEM USING REDUNDANCY INDEX | KENJI SATO | | CHARACTERS 1-52 | | | |
| | | | | REFERENCE ALLOWED COPY ALLOWED PRINT ALLOWED DEPARTMENT DIRECTOR OR HIGHER POSITION | REFERENCE ALLOWED COPY DISALLOWED PRINT ALLOWED SECTION CHIEF | REFERENCE ALLOWED COPY DISALLOWED PRINT DISALLOWED SUBSECTION CHIEF OR LOWER POSITION | ... |

FOREIGN PATENT DOCUMENTS

| | | |
|---|---|---|
| H05-334324 | 12/1993 | (JP) . |
| 7-36768 | 2/1995 | (JP) . |
| 7-56827 | 3/1995 | (JP) . |
| 7-191975 | 7/1995 | (JP) . |
| 7-239807 | 9/1995 | (JP) . |
| 8-161213 | 6/1996 | (JP) . |
| 8-190545 | 7/1996 | (JP) . |
| H08-292976 | 11/1996 | (JP) . |

* cited by examiner

FIG.2

| REFERENCE LEVEL | COPY LEVEL | PRINT LEVEL |
|---|---|---|
| DISALLOWED | DISALLOWED | DISALLOWED |
| PAY | PAY | PAY |
| APPLICATION REQUIRED | APPLICATION REQUIRED | APPLICATION REQUIRED |
| ALLOWED | ALLOWED | ALLOWED |
| ALLOWED WITH DISPLAY OF COPYRIGHT | ALLOWED WITH DISPLAY OF COPYRIGHT | ALLOWED WITH DISPLAY OF COPYRIGHT |
| FREE | FREE | FREE |

FIG.3

| ID | TITLE OF DOCUMENT | WRITER | APPLICATION-FILED USER | RANGE INFORMATION 1 | RANGE INFORMATION 2 | ... |
|---|---|---|---|---|---|---|
| 1 | HIGH-SPEED FULL TEXT SEARCH SYSTEM RETRIEVAL EXPRESS | TORU AKAMINE | A,B,C | CHARACTERS 1-48 REFERENCE ALLOWED COPY ALLOWED PRINT ALLOWED | CHARACTERS 49-550 REFERENCE ALLOWED COPY ALLOWED APPLICATION REQUIRED FOR PRINT | ... |
| 2 | OCR TEXT SEARCH SYSTEM USING REDUNDANCY INDEX | KENJI SATO | X,Y,Z | CHARACTERS 1-52 REFERENCE ALLOWED COPY ALLOWED PRINT ALLOWED | CHARACTERS 53-80, FIGURE REFERENCE ALLOWED COPY ALLOWED PRINT ALLOWED DIVISION DISALLOWED | ... |

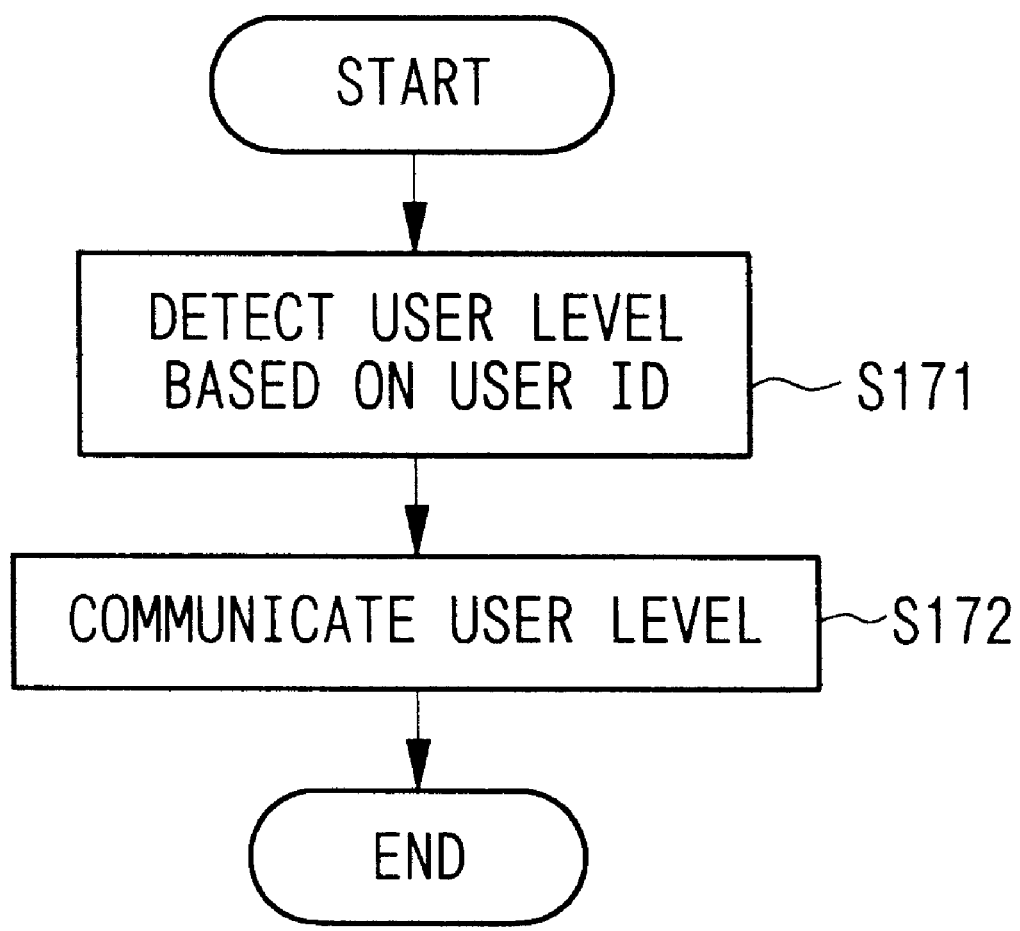

FIG.16

| ID | TITLE OF DOCUMENT | WRITER | APPLICATION-FILED USER | RANGE INFORMATION 1 | | ... |
|----|---|---|---|---|---|---|
| | | | | CHARACTERS 1-48 | | ... |
| 1 | HIGH-SPEED FULL TEXT SEARCH SYSTEM USING RETRIEVAL EXPRESS | TORU AKAMINE | | REFERENCE ALLOWED COPY ALLOWED PRINT ALLOWED DEPARTMENT DIRECTOR OR HIGHER POSITION | REFERENCE ALLOWED COPY DISALLOWED PRINT DISALLOWED SECTION CHIEF OR LOWER POSITION | |
| | | | | CHARACTERS 1-52 | | ... |
| 2 | OCR TEXT SEARCH SYSTEM USING REDUNDANCY INDEX | KENJI SATO | | REFERENCE ALLOWED COPY ALLOWED PRINT ALLOWED DEPARTMENT DIRECTOR OR HIGHER POSITION | REFERENCE ALLOWED COPY DISALLOWED PRINT ALLOWED SECTION CHIEF | REFERENCE ALLOWED COPY DISALLOWED PRINT DISALLOWED SUBSECTION CHIEF OR LOWER POSITION |

DETERMINING COPYRIGHT INFORMATION BASED ON OVERLAPPING INFORMATION BETWEEN PORTIONS OF TWO DOCUMENTS

BACKGROUND OF THE INVENTION

1. Field of the Invention

This invention relates to document management systems that manage electronic documents and copyright. This application is based on patent application No. Hei 9-139358 filed in Japan, the content of which is incorporated herein by reference.

2. Prior Art

In general, the conventional document management system that manages the document produced by the document production device is designed to manage attributes of the document such as the title of the document, author (or writer) and date to produce the document. However, the conventional document management system is not designed to manage the copyright information used for management of the copyright. As the distribution of the electronic documents becomes popular, there occur a number of cases that infringement of the copyright of the document occur. To protect the copyright, it is necessary to equip the document management system with the mechanism for protection of the copyright.

One example of the method for protection of the copyright is disclosed by the paper of Japanese Patent Application, Publication No. Hei 8-190545, which is entitled "Document Management System". According to the technology of this paper, there is provided a copyright management information storage unit, which stores only one copyright management information corresponding to the full text of the document in connection with the document ID. Herein, the copyright management information is constructed by multiple processing conditions that represent comments such as "copy allowed" and "print disallowed". When receiving a request that a user who produces a document wishes to use another document produced by another person, the system refers to copyright management information of another document to provide a decision that the use of another document is permissible or impermissible. Thus, it is possible to protect the copyright.

However, the conventional technology described above is incapable of managing the document which has different copyrights with respect to construction units (or constituent elements) of the document such as the chapter, paragraph, sentence, figure and table respectively. For example, the conventional technology cannot perform fine management of the copyrights with respect to the case where the sentence is permissible in copy while the photograph is impermissible in copy. Because, the conventional technology is designed to merely perform copyright management with respect to the selected unit of the document.

SUMMARY OF THE INVENTION

It is an object of the invention to produce a document management system that is capable of setting copyright management information with respect to each of constituent elements of the document.

According to a document management system of this invention, copyright management information is set with respect to a constituent element of a document that a user produces. The constituent element corresponds to a chapter, a paragraph, a sentence, a figure or a table, for example. The copyright management information represents copyright information regarding the use of the document, which is classified into prescribed levels such as a reference level, a copy level and a print level. In addition, it represents prescribed conditions as to whether or not the use of the document is allowed with payment of fee, with filing of application and with display of copyright, for example. Further, the content of the copyright management information can be changed in response to user levels respectively. The copyright management information is connected with information representing the constituent element.

When the user requests to use a prescribed portion of another document other than the document that the user is presently producing, a use-allowed part is determined within the prescribed portion on the basis of the copyright management information of the constituent element overlapping with the prescribed portion. So, the user is capable of making a decision whether to actually use the use-allowed part in consideration of the prescribed conditions.

Incidentally, the document management system is designed to have a capability of performing an application process to file an application for an approval of use with respect to a copyright set to the prescribed portion that the user requests to use.

BRIEF DESCRIPTION OF THE DRAWINGS

These and other objects of the subject invention will become more fully apparent as the following description is read in light of the attached drawings wherein:

FIG. 2 shows examples of conditions that can be set for copyright management information;

FIG. 3 shows an example of stored content of a copyright management information storage unit shown in FIG. 1;

FIG. 15 is a flowchart showing an example of processing of a user level management unit shown in FIG. 14;

FIG. 16 shows an example of content of a copyright management information storage unit shown in FIG. 14;

DESCRIPTION OF THE PREFERRED EMBODIMENT

Now, examples of the document management system of this invention will be described with reference to drawings.

Figure 1:
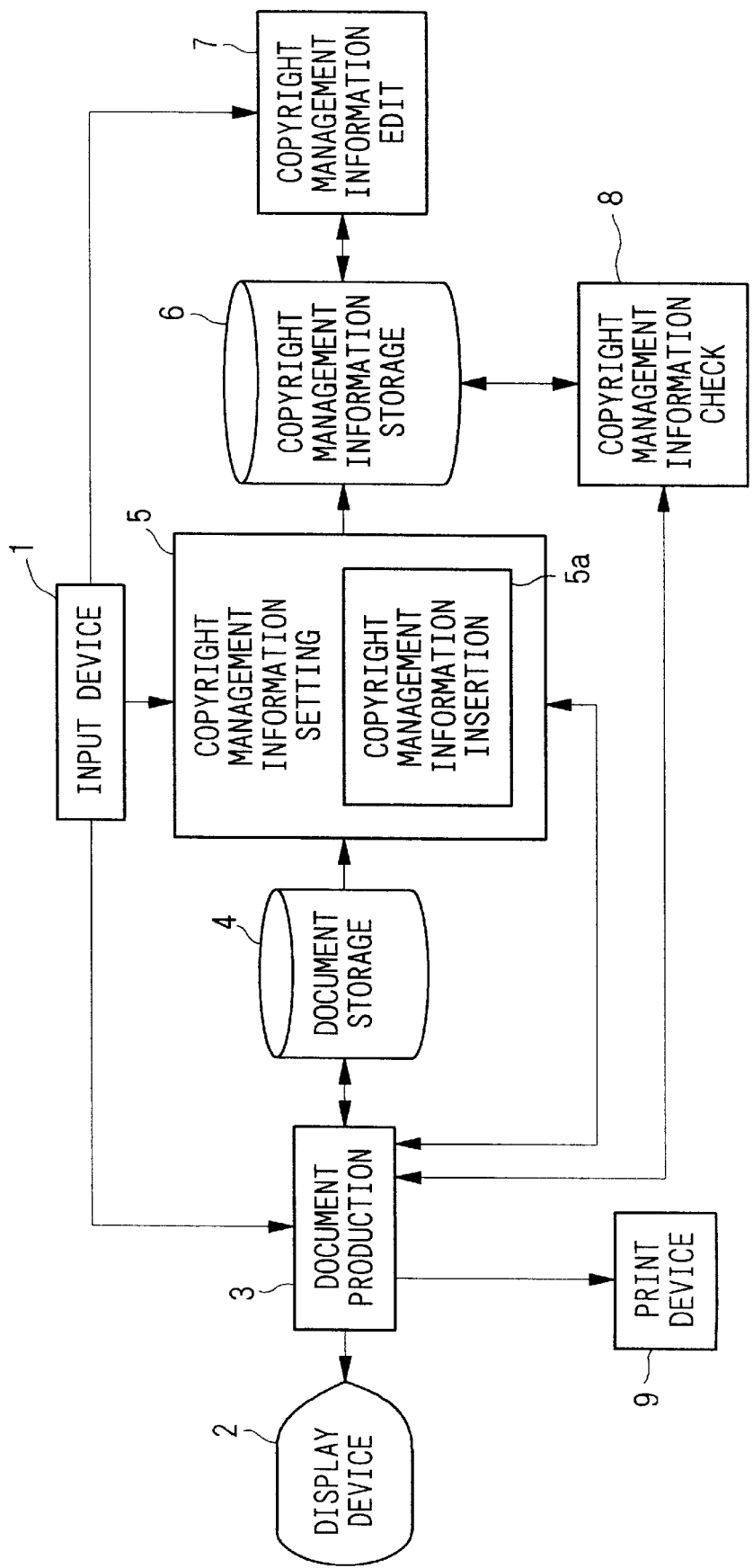
FIG. 1 is a block diagram showing a first example of a configuration of a document management system in accordance with this invention.

FIG. 1 is a block diagram showing a document management system according to a first example of this invention. The document management system of FIG. 1 is configured by an input device 1, a display device 2, a document production unit 3, a document storage unit 4, a copyright management information setting unit 5, a copyright management information storage unit 6, a copyright management information edit unit 7, a copyright management information check unit 8 and a print device 9. Herein, the input device 1 is configured by a keyboard, an image scanner or else; the display device 2 is configured by a CRT unit or else; the document storage unit 4 is configured by a hard-disk unit or else; the copyright management information storage unit 6 is configured by a hard-disk unit or else.

The copyright management information storage unit 6 stores copyright management information with respect to each of the documents stored in the document storage unit 4. The copyright management information is set with respect to constituent elements of the document such as the chapter, paragraph, sentence, figure and table respectively. It shows processing conditions for a reference level, a copy level or a print level with respect to the constituent element of the document. FIG. 2 shows examples of the processing conditions for the reference level, copy level and print level, wherein it is possible to set conditions such as "disallowed", "pay", "application required", "allowed", "allowed with display of copyright" and "free". In addition to the above conditions, it is possible to set a condition of "division disallowed". This condition is set for a certain constituent element for which a partial quotation should be avoided.

FIG. 3 shows an example of stored content of the copyright management information storage unit 6, which stores multiple pieces of information with regard to "document ID", "title of document", "writer", "user who filed an application" (simply referred to as "application-filed user") and multiple sets of range information. Herein, the range information is constructed by copyright management information and location information. The location information represents a part (or location) of the document that the copyright management information regards. In FIG. 3, for example, "range information 2" regarding the document whose "document ID" is "1" represents conditions as follows:

As for a part of the document 1 which ranges from character 49 to character 550, conditions are set such that reference is allowed while copy is disallowed, wherein an application is required to perform print.

The document production unit 3 has several functions such as a function to produce the document, a function to edit the document, a function to copy the other document stored in the document storage unit 4 into the document that is presently producing, and a function to print the document stored in the document storage unit 4 by using the print device 9.

The copyright management information setting unit 5 sets copyright management information with respect to constituent elements of the document produced by the document production unit 3, wherein the setting of the copyright management information is performed in a dialogue manner. The copyright management information setting unit 5 has a function to store the set copyright management information, which is connected with its constituent element, in the copyright management information storage unit 6. The copyright management information setting unit 5 is equipped with a copyright management information insertion unit 5a. This copyright management information insertion unit 5a has a function that when a certain document is copied and inserted into the document being presently produced by the document production unit 3, its copyright management information is inserted into a line of range information of the document being presently produced.

The copyright management information editing unit 7 has a function to edit the copyright management information stored in the copyright management information storage unit 6 in accordance with an instruction given from a person who produces the document. Due to the editing of the copyright management information, it is possible to change the processing condition(s) and range(s), while it is possible to provide the new setting.

The copyright management information check unit 8 has functions as follows:

When during the document production unit 3 produces the document, the reference, copy and print are requested with respect to a prescribed portion of another document stored in the document storage unit 4, the copyright management information check unit 8 determines a permissible part of the prescribed portion of another document for which the reference, copy and print are permissible on the basis of the copyright management information regarding a part overlapping with the prescribed portion. Then, determination result is returned to the document production unit 3.

Figure 4:
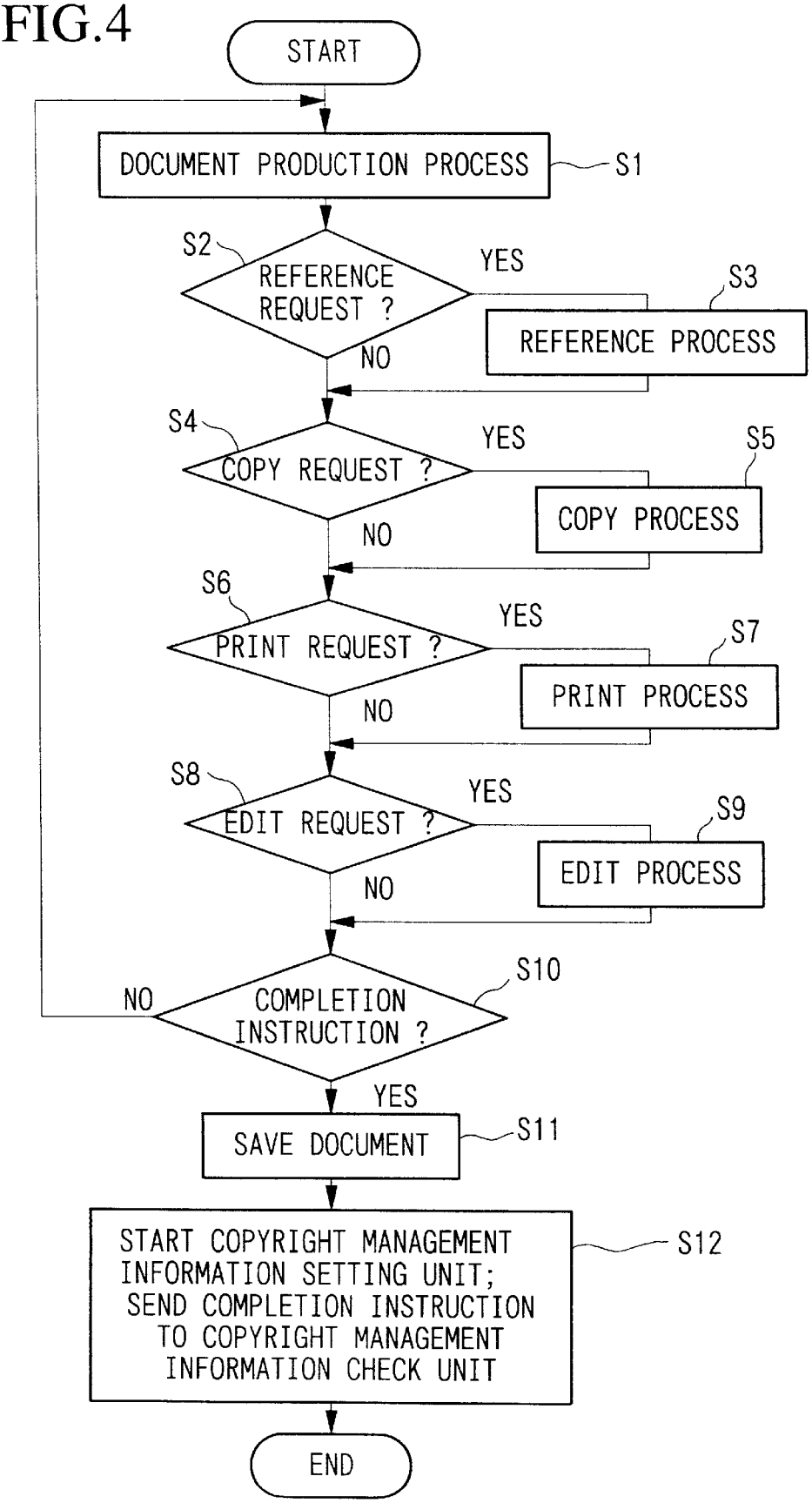
FIG. 4 is a flowchart showing an example of processing of a document production unit shown in FIG. 1.
Figure 5:
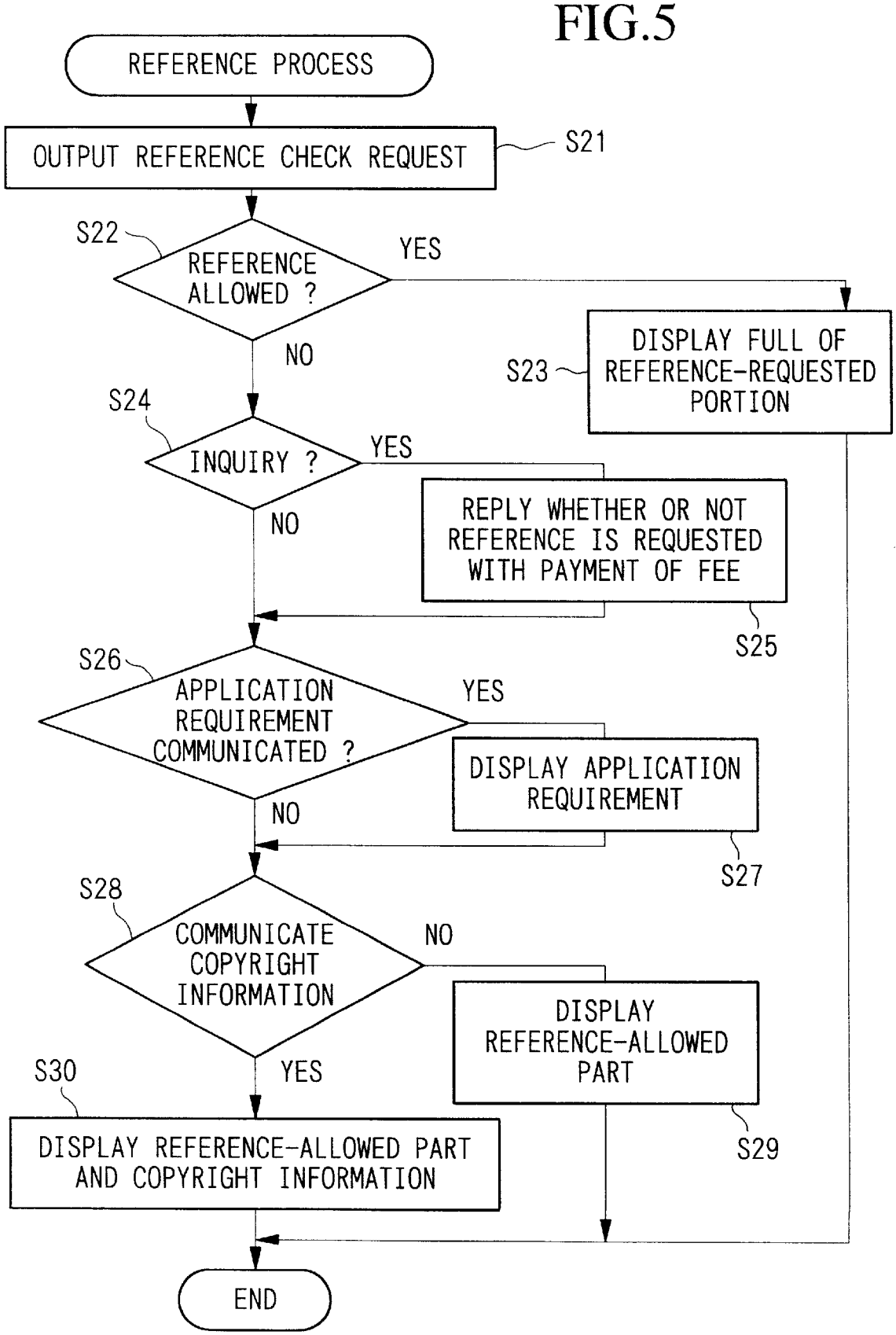
FIG. 5 is a flowchart showing an example of a reference process performed by the document production unit.
Figure 6:
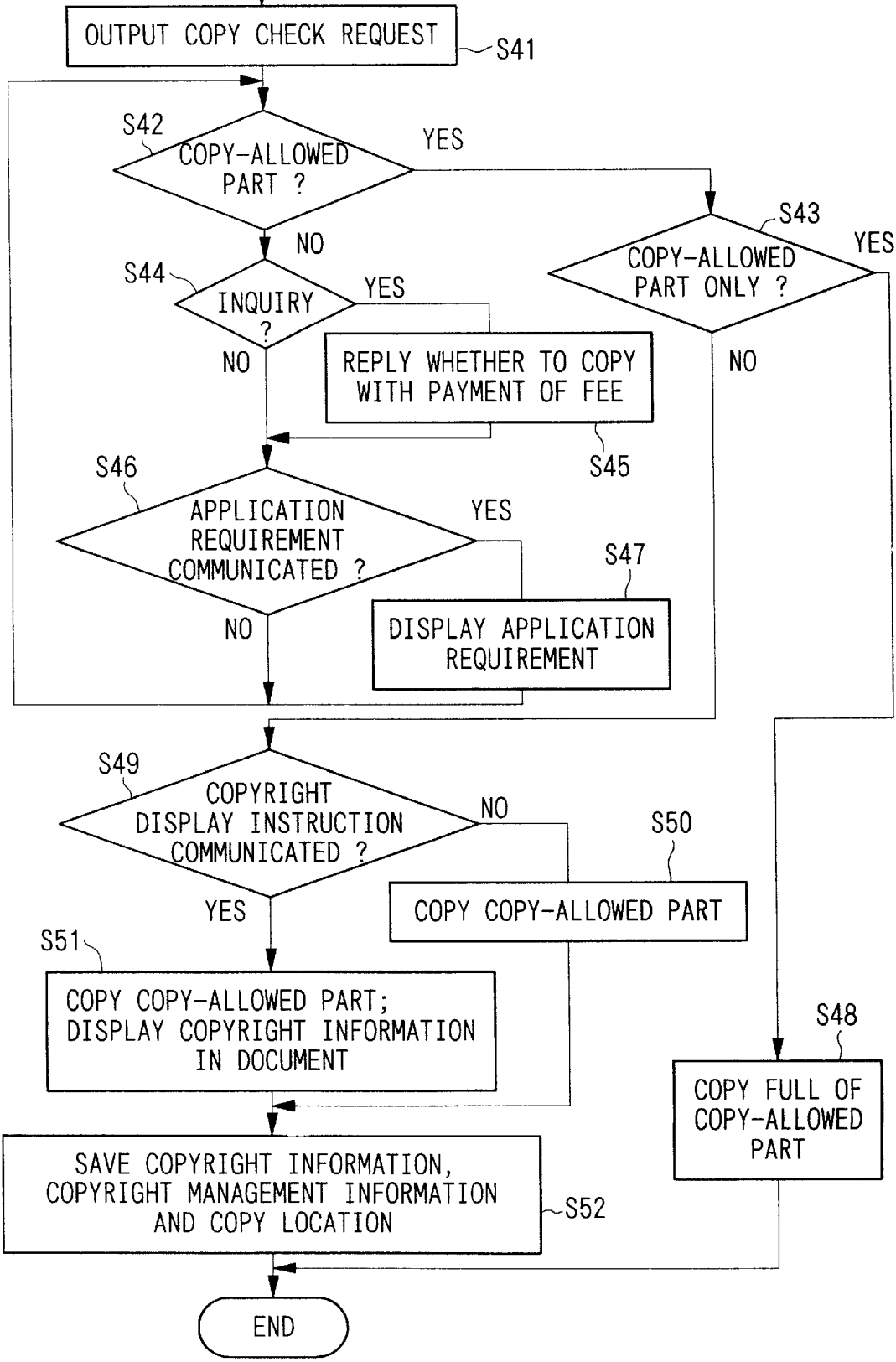
FIG. 6 is a flowchart showing an example of a copy process performed by the document production unit.
Figure 7:
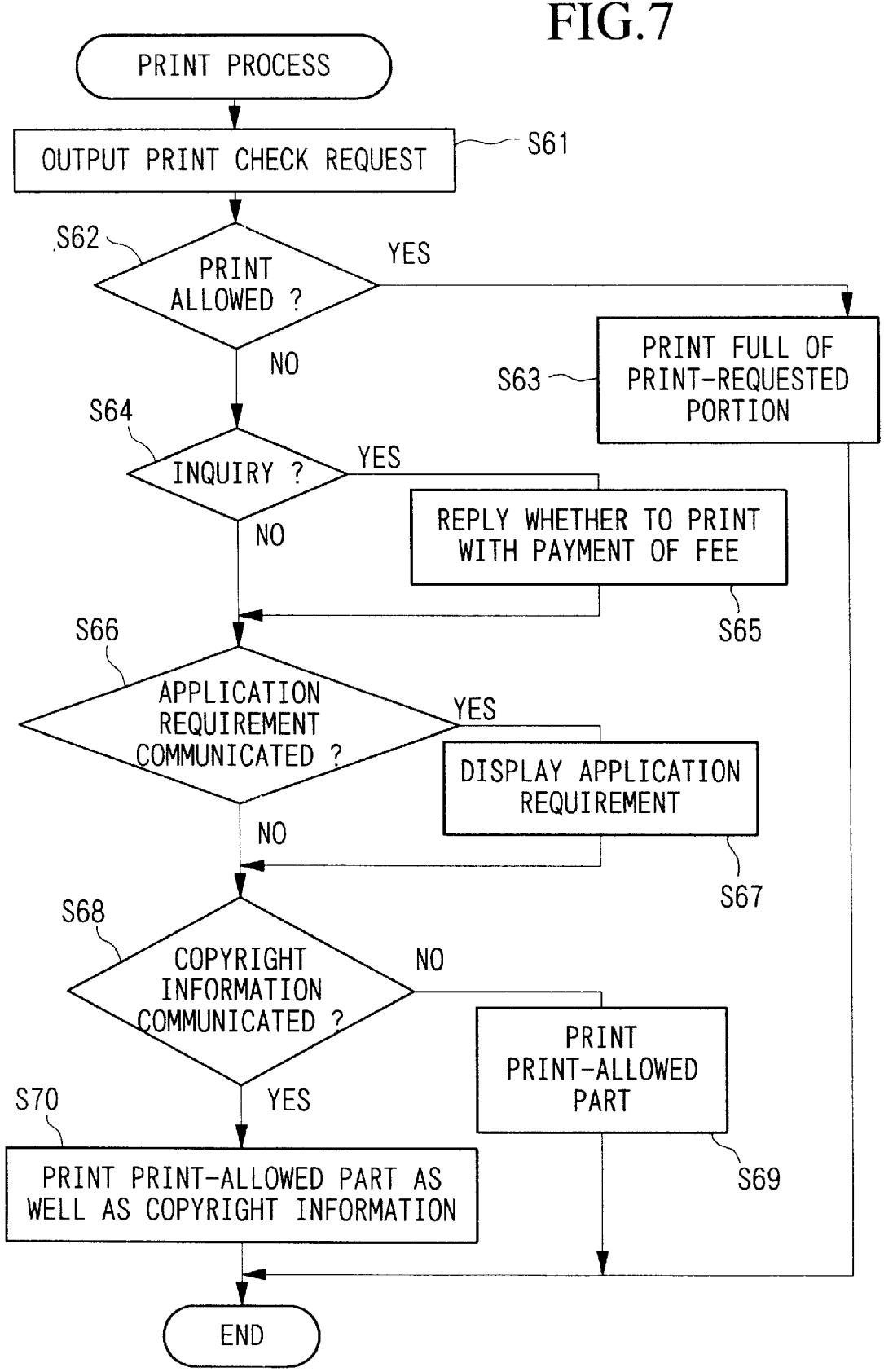
FIG. 7 is a flowchart showing an example of a print process performed by the document production unit.
Figure 8:
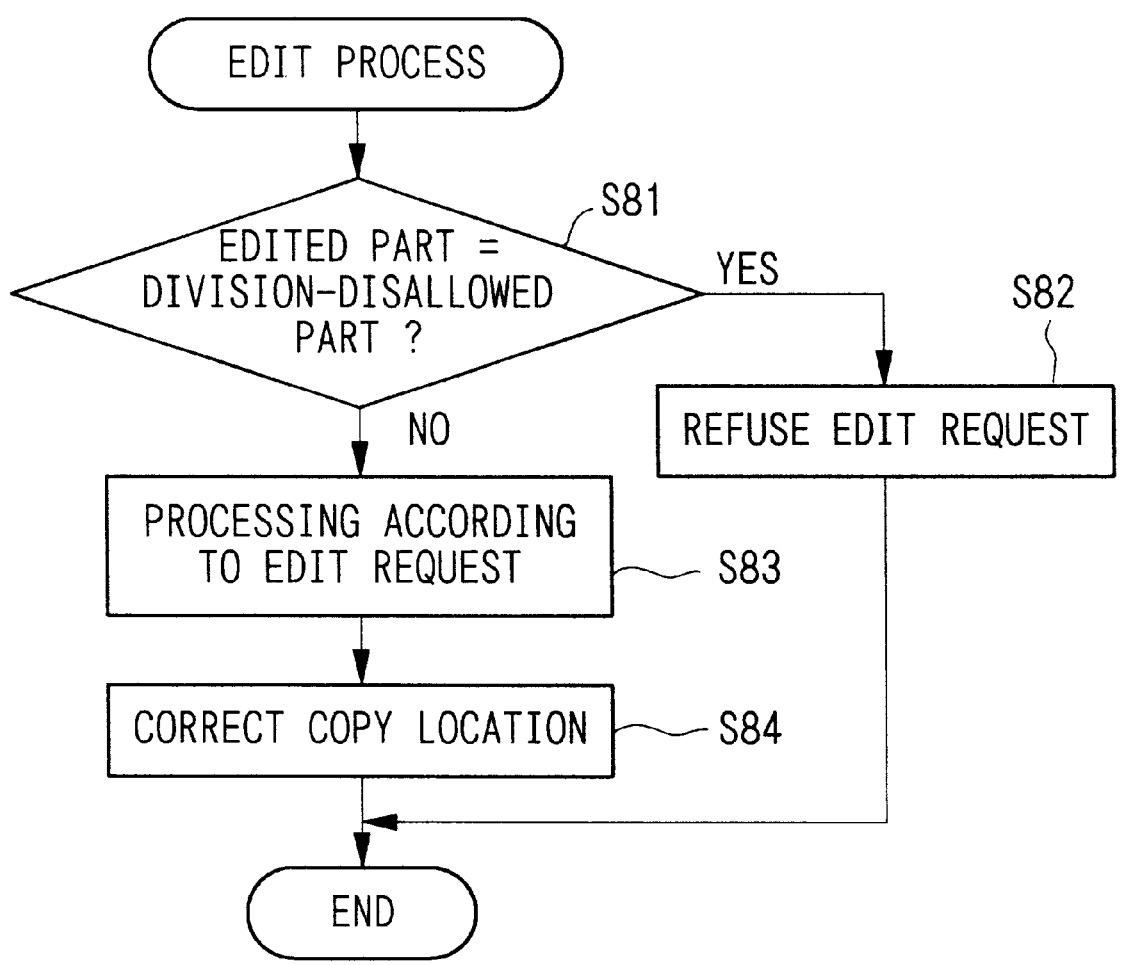
FIG. 8 is a flowchart showing an example of an edit process performed by the document production unit.
Figure 9:
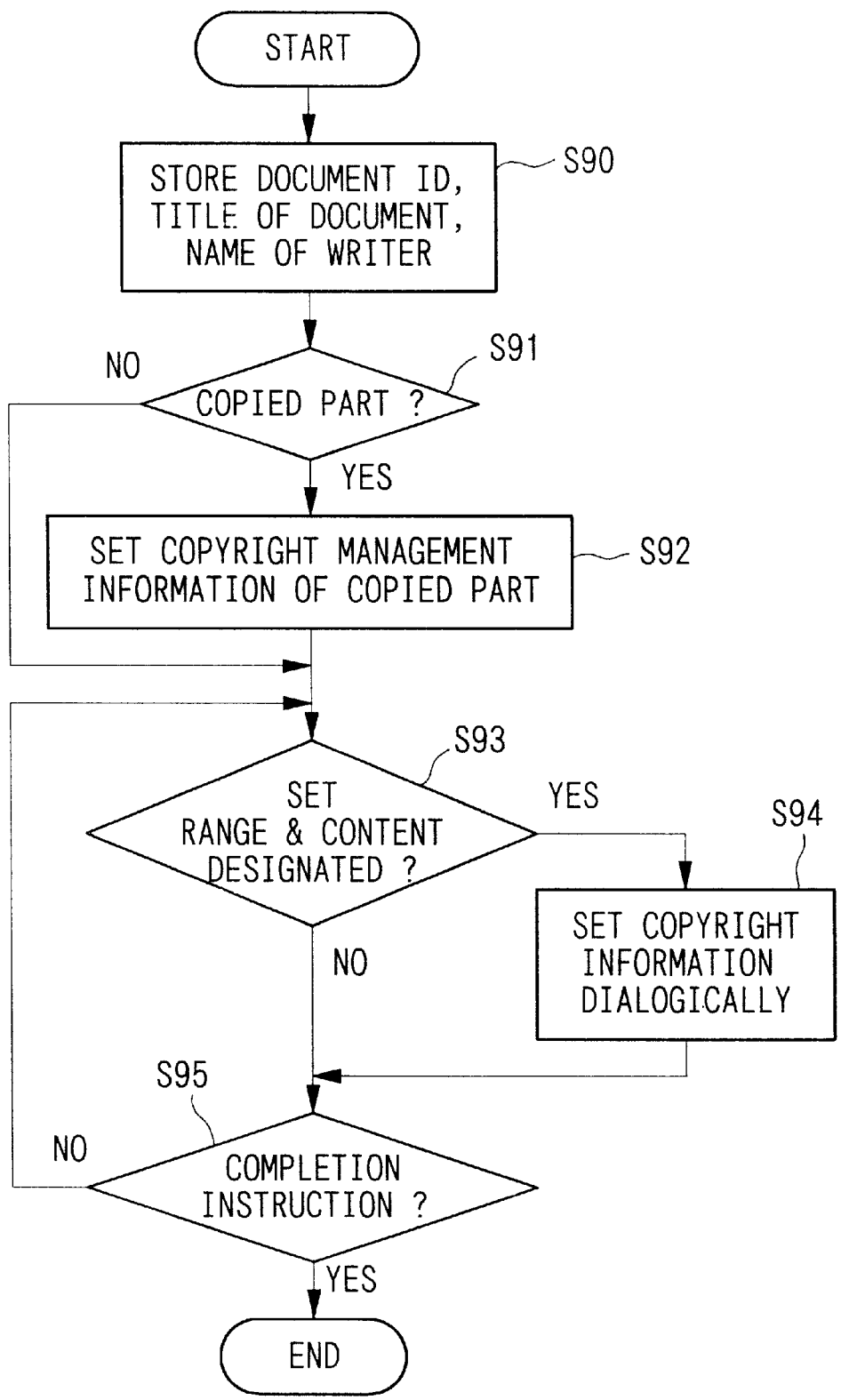
FIG. 9 is a flowchart showing an example of processing of a copyright management information setting unit shown in FIG. 1.
Figure 10:
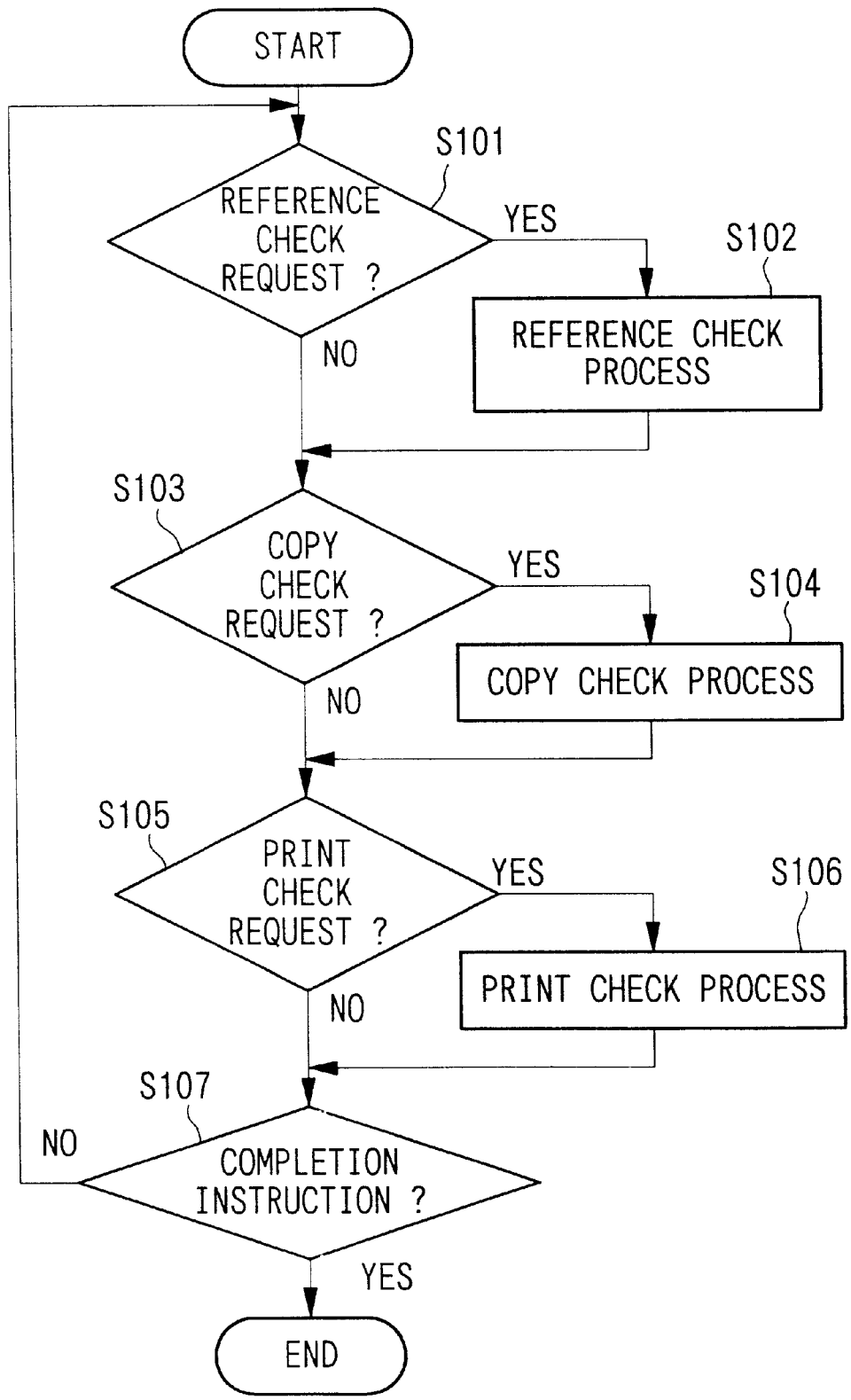
FIG. 10 is a flowchart showing an outline of processing of a copyright management information check unit shown in FIG. 1.
Figure 11A:
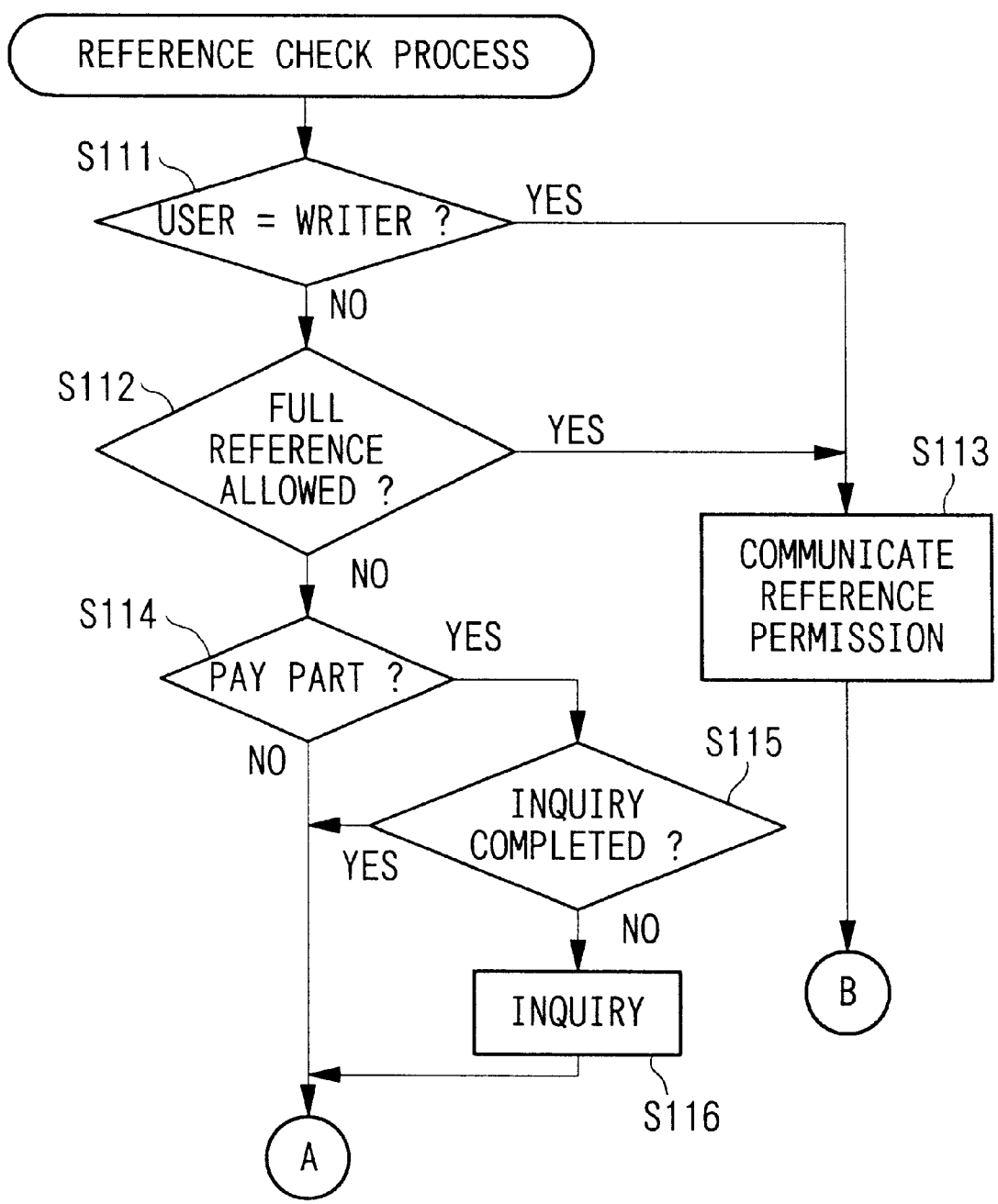
FIGS. 11A and 11B are flowcharts showing a reference check process performed by the copyright management information check unit.
Figure 11B:
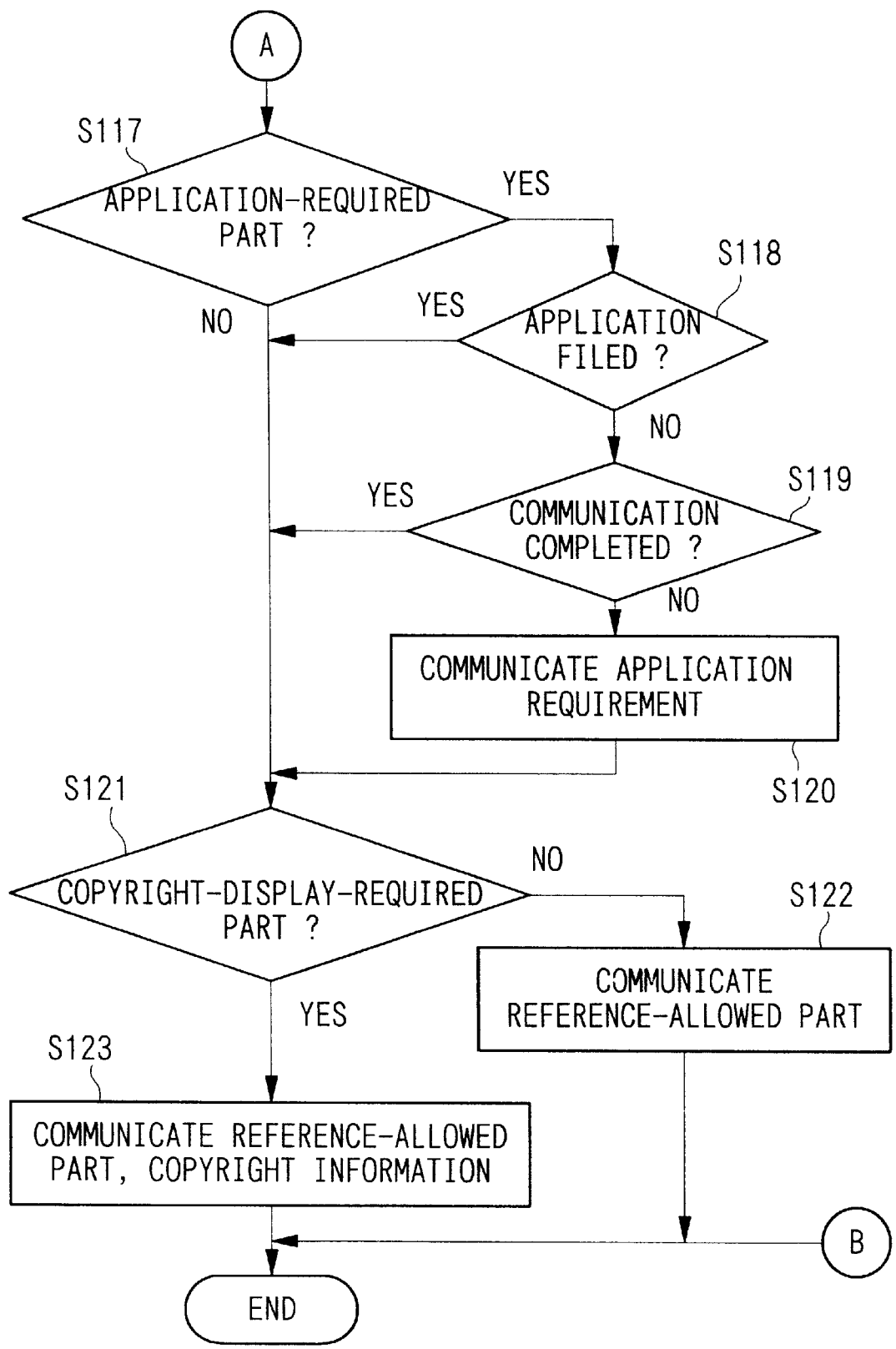
Figure 12A:
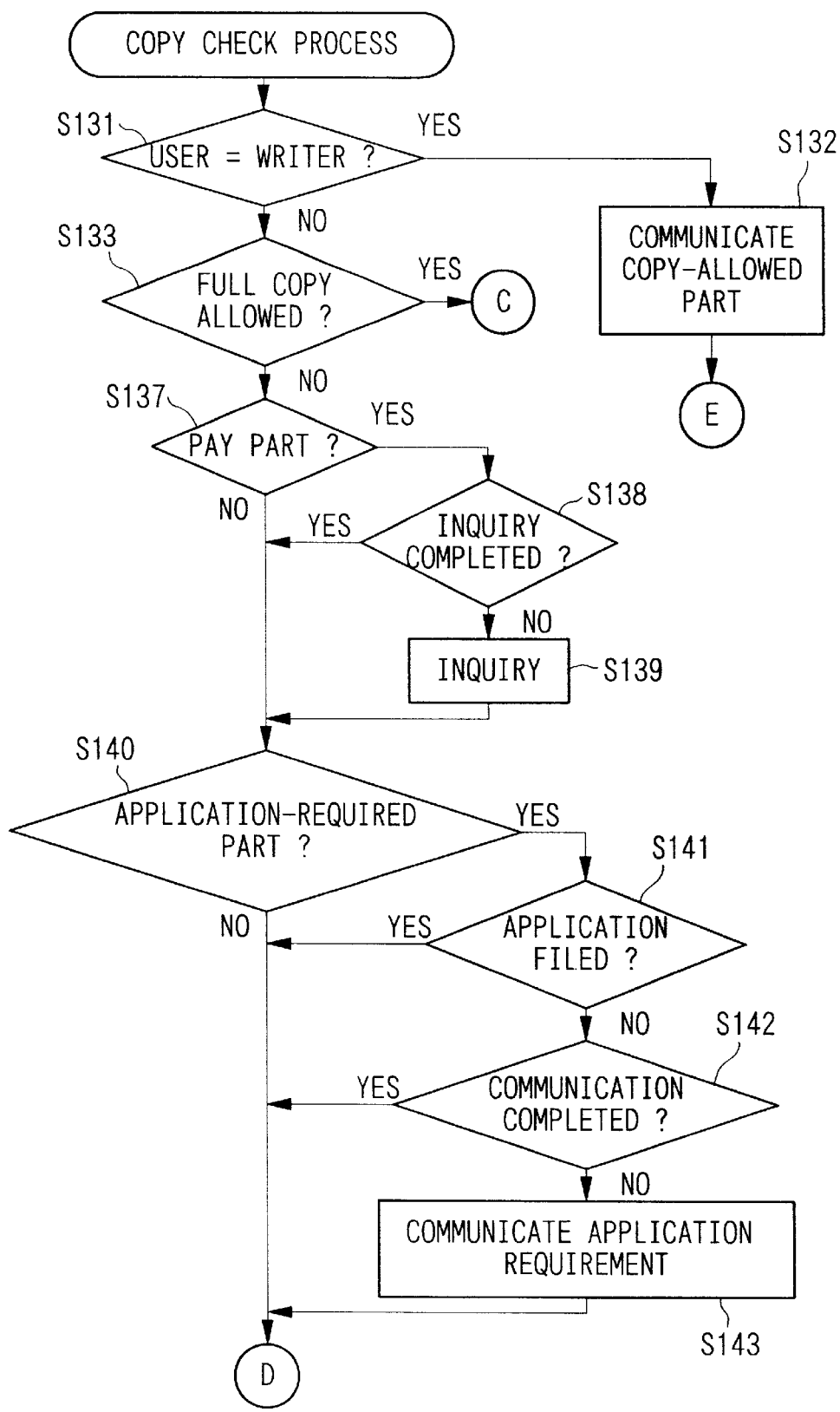
FIGS. 12A and 12B are flowcharts showing a copy check process performed by the copyright management information check unit.
Figure 12B:
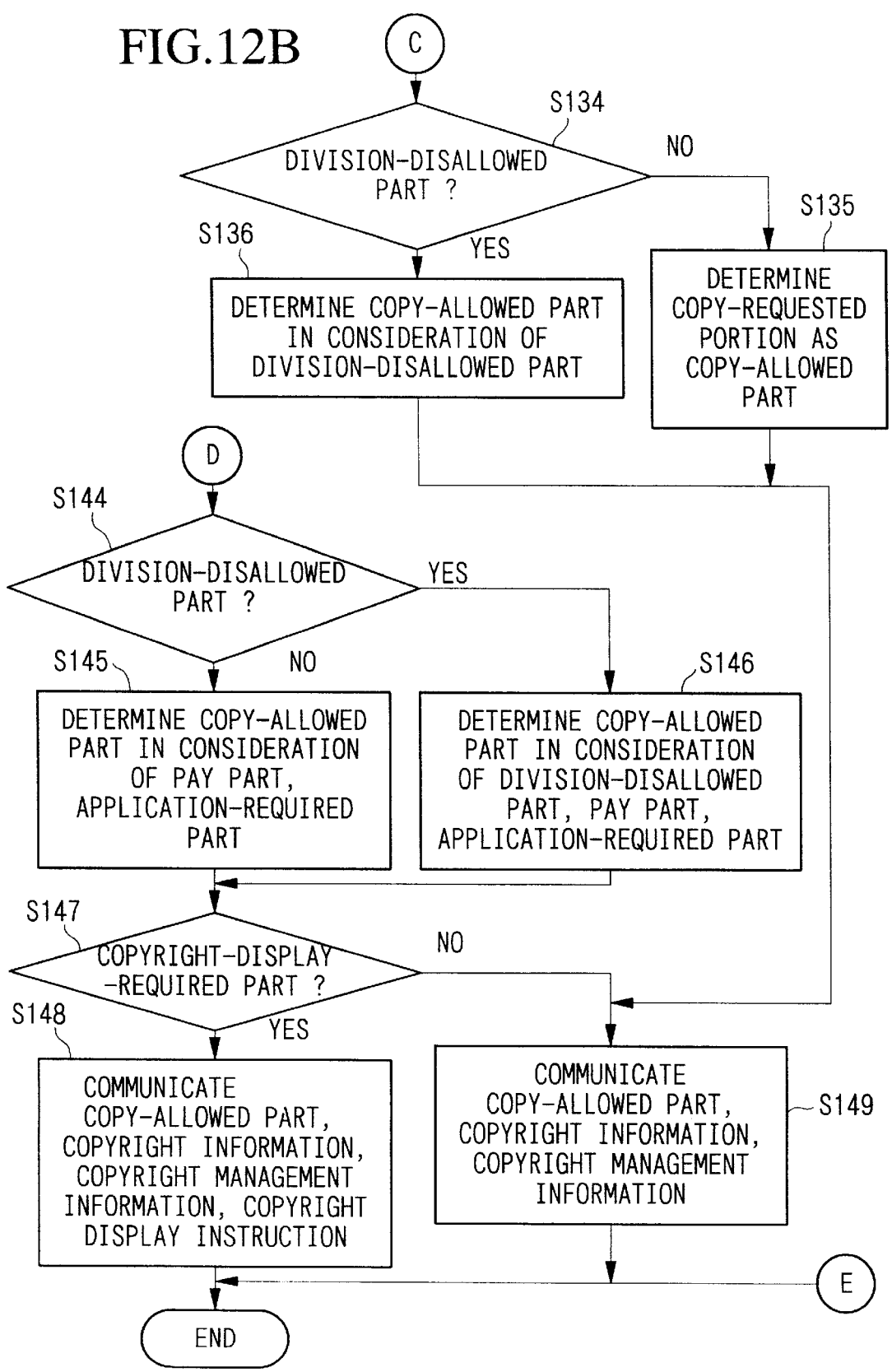
Figure 13A:
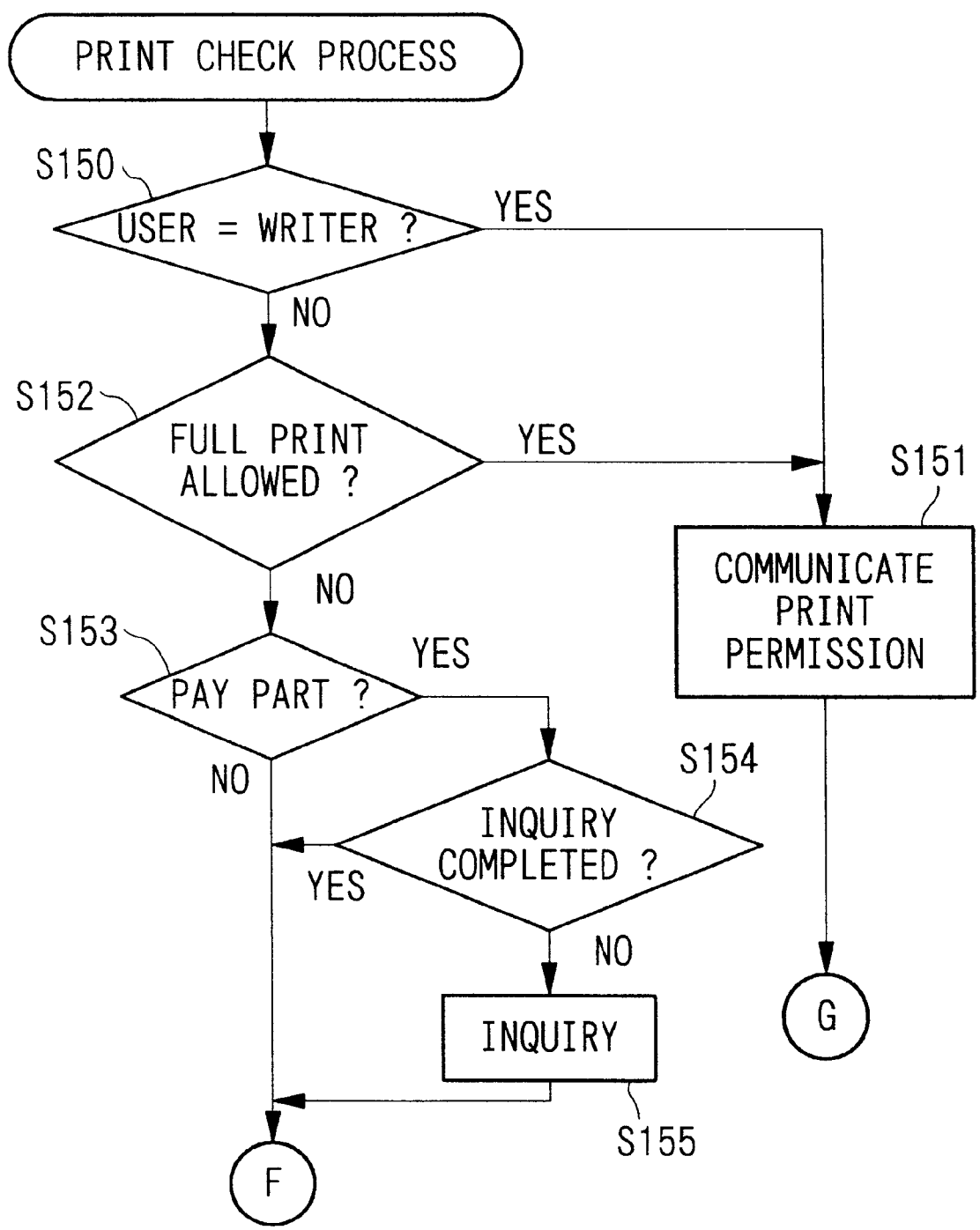
FIGS. 13A and 13B are flowcharts showing a print check process performed by the copyright management information check unit.
Figure 13B:
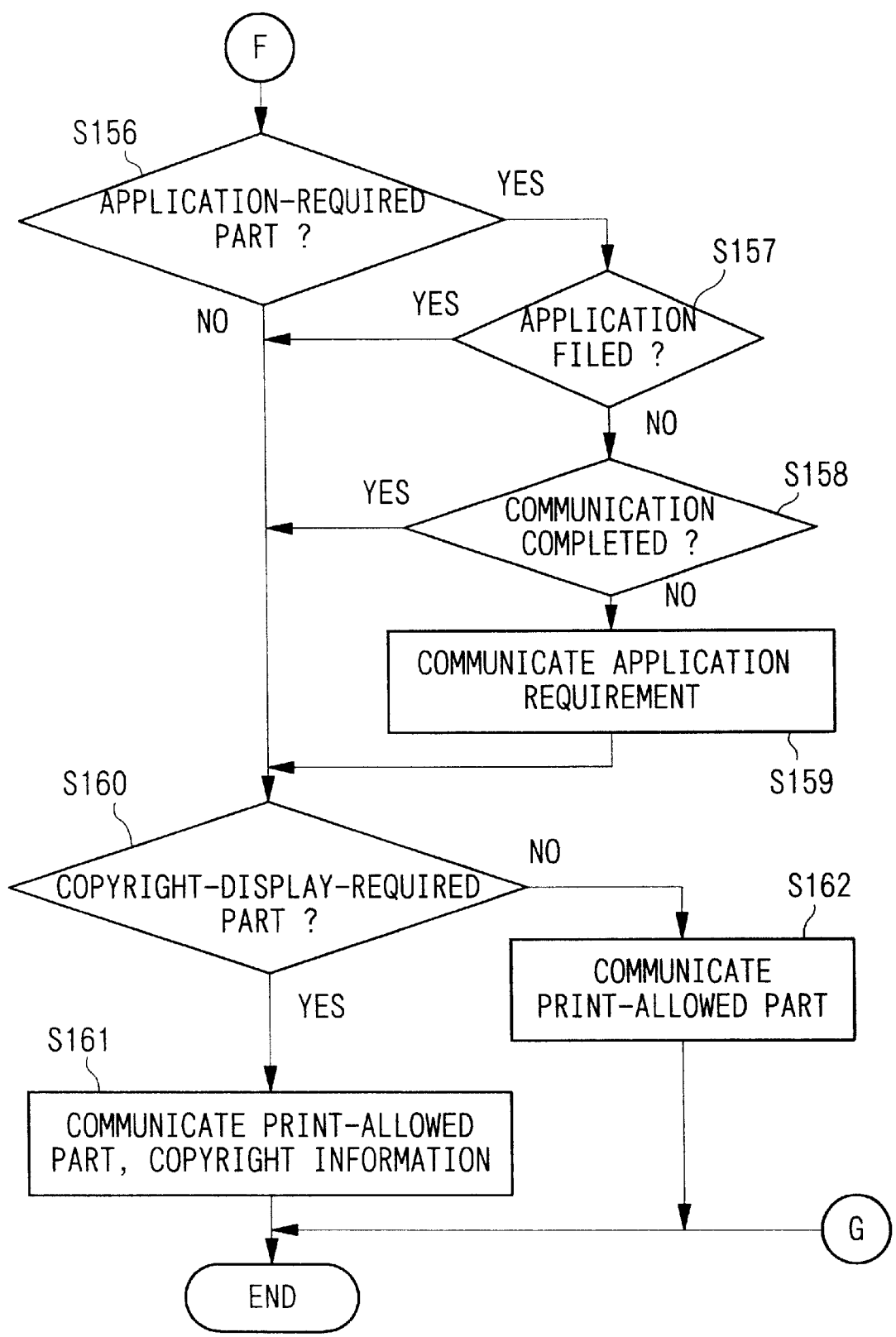

FIG. 4 is a flowchart showing a flow of steps in processing of the document production unit 3. FIG. 5 is a flowchart showing a flow of steps regarding a reference process of the document production unit 3. FIG. 6 is a flowchart showing a flow of steps regarding a copy process of the document production unit 3. FIG. 7 is a flowchart showing a flow of steps regarding a print process of the document production unit 3. FIG. 8 is a flowchart showing a flow of steps regarding an edit process of the document production unit 3. FIG. 9 is a flowchart showing a flow of steps in processing of the copyright management information setting unit 5. FIG. 10 is a flowchart showing an outline of processing of the copyright management information check unit 8. FIGS. 11A and 11B are flowcharts showing a flow of steps regarding a reference check process of the copyright management information check unit 8. FIGS. 12A and 12B are flowcharts showing a flow of steps regarding a copy check process of the copyright management information check unit 8. FIGS. 13A and 13B are flowcharts showing a flow of steps regarding a print check process of the copyright management information check unit 8. So, operations of the document management system will be described with reference to the above flowcharts respectively.

In some case, while using the document production unit 3 to produce a document (see step Si in FIG. 4), a user wishes to refer to another document stored in the document storage unit 4. In that case, the user inputs a reference request using the input device 1. When the document production unit 3 inputs the reference request (i.e., "YES" of step S2), it performs a reference process in step S3. Incidentally, the document production unit 3 performs the reference process of step S3 in response to a reference change request that a change of a referred portion of the document is requested.

Details of the reference process is shown in FIG. 5. So, when performing the reference process of step S3, the document production unit 3 outputs a reference check request to the copyright management information check unit 8 in step S21 shown in FIG. 5. The reference check request contains multiple pieces of information such as a document ID of a reference-requested document to which reference is requested as well as a reference-requested portion of the document and a name of the user of the document production unit 3. Incidentally, if the step S21 is activated by the reference request that is input to the document production unit 3 from the input device 1, the step S21 performs a series of operations as follows:

A list of documents stored in the document storage unit 4 is visually displayed on a screen of the display device 2. So, the user selects the document to which the user wishes to refer. By such a selection of the document, it is possible to obtain the document ID, which should be contained in the reference check request. In addition, the reference-requested portion of the document corresponds to a prescribed range of the document which starts from the top portion of the document. Herein, the prescribed range depends on the size of the display portion of the reference-requested document on the display device 2.

In contrast, if the step S21 is activated by a reference change request to change the reference-requested portion of the document, the step S21 performs a series of operations as follows:

A new reference-requested portion that responds to the referent change request is determined based on the content of the reference change request and the presently reference-requested portion. So, the new reference-requested portion is inserted into the reference check request.

When receiving the reference check request given from the document production unit 3, the copyright management information check unit 8 performs a reference check process in step S102 shown in FIG. 10, which is activated when a decision result of step S101 is "YES". Incidentally, the copyright management information check unit 8 is started by the start of the document production unit 3.

Details of the reference check process of step S102 is shown in FIGS. 11A and 11B. In step S111 shown in FIG. 11A, a decision is made as to whether a writer of the reference-requested document coincides with the user of the document production unit 3 or not. The above decision is made based on the stored content of the copyright management information storage unit 6. When making a decision that the writer of the reference-requested document coincides with the user of the document production unit 3, the copyright management information check unit 8 communicates a reference permission to the document production unit 3 in step S113.

When receiving the reference request from the copyright management information check unit 8, the document production unit 3 picks up full of the reference-requested portion from the document storage unit 4 so as to display it on the display device 2. This is made in step S23, which is activated when a decision result of step S22 is "YES".

Meanwhile, if the copyright management information check unit 8 makes a decision that the writer does not coincide with the user, in other words, when a decision result of step S111 shown in FIG. 11A is "NO", it makes a decision as to whether fill of the reference-requested portion can be subjected to reference with permission or not in step S112. The above decision of step S112 is made with reference to the stored content of the copyright management information storage unit 6. Suppose a case where the stored content of the copyright management information storage unit 6 is shown in FIG. 3, wherein the reference-requested portion corresponds to a range of characters from character 20 to character 100 with regard to the document whose document ID is "1". In that case, FIG. 3 shows that the reference-requested portion overlaps with the character range defined in the range information 1 and a part of the character range defined in the range information 2, wherein both of the character ranges are permissible in reference. So, a program control goes to step S113 from step S112. Incidentally, the copyright management information check unit 8 makes a decision that the reference is allowed if the copyright management information is not set with respect to a part overlapping with the reference-requested portion or if the reference-requested portion is placed in a condition of "reference free".

If the copyright management information check unit 8 makes a decision that the full of the reference-requested portion is permissible in reference in step S112, it communicates a reference request to the document production unit 3 in step 8113. On the other hand, if a decision result of step S112 is "NO", the copyright management information check unit 8 proceeds to step S114, wherein a decision is made as to whether the reference-requested portion contains a pay part, corresponding to paid reference, or not.

If the copyright management information check unit 8 makes a decision that the reference-requested portion contains the pay part, it transfers control to step S115. Herein, an inquiry is given as to whether or not the user wishes to perform reference with respect to the reference-requested document even if payment of fee is required for the reference. In step S115, a decision is made as to whether such an inquiry is given with respect to the reference-requested document in a duration between the start of the system and the present timing. If the copyright management information check unit 8 makes a decision that such an inquiry is not given with respect to the reference-requested document, it transfers control to step S116. Herein, the unit 8 gives an inquiry as to whether the reference is performed with respect to the reference-requested document with the payment of fee or not. Such an inquiry is supplied to the document production unit 3, so the copyright management information check unit 8 waits for a reply from the document production unit 3.

So, the document production unit 3 receives an inquiry, from the copyright management information check unit 8, as to whether the user wishes to perform reference with respect to the reference-requested document with the payment of fee or not. Thus, a decision result of step S24 shown in FIG. 5 turns to "YES", so that the document production unit 3 proceeds to step S25. Herein, the document production unit 3 displays such an inquiry on the display device 2, so that it transfers a reply corresponding to an instruction of the user to the copyright management information check unit 8.

When receiving the reply from the document production unit 3, the copyright management information check unit 8 retains the content of the reply therein (see step S116 in FIG. 11A).

The copyright management information check unit 8 transfers control to step S117 when a decision result of step S114 is "NO", when a decision result of step S115 is "YES" or when the step S116 is completed. In step S117 shown in FIG. 11B, the unit 8 makes a decision as to whether the reference-requested portion contains an application-required part, which requires an application to be filed for the reference, or not. Such a decision is made based on the stored content of the copyright management information storage unit 6.

If a decision result of step S117 is "YES", the copyright management information check unit 8 transfers control to step S118. Herein, the unit; 8 refers to the copyright management information storage unit 6 to make a decision as to whether the user of the document production unit 3 is an application-filed user who filed an application for the reference or not.

If the copyright management information check unit 8 makes a decision in step S118 that the user is not the application-filed user, it transfers control to step S119. Herein, a decision is made as to whether a communication of an application-requirement message that an application is required for the reference is performed with respect to the reference-requested document in a duration between the start of the system and the present timing. If the communication is not performed, the copyright management information check unit 8 transfers control to step S120, wherein it communicates the application-requirement message to the document production unit 3.

When receiving the application-requirement message from the copyright management information check unit 8, the document production unit 3 displays it on the display device 2. Thus, the user is informed of the application-requirement message. This is made in step S27, which is activated when a decision result of step S26 is "YES".

The copyright management information check unit 8 transfers control to step S121 when a decision result of step S117 is "NO", when a decision result of step S118 is "YES", when a decision result of step S119 is "YES", or when the step S120 is completed.

In step S121, a decision is made as to whether the reference-requested portion contains a copyright-display-required part, that requires a display of copyright for the reference, or not.

If a decision result of step S121 is "NO", the copyright management information check unit 8 transfers control to step S122. Herein, the unit 8 extracts a reference-allowed part within the reference-requested portion so as to communicate it to the document production. The reference-allowed part contains a part, overlapping with the reference-requested portion, of which copyright management information represents a condition of "reference allowed" or a condition of "reference free". In some case, the application is completely filed, while the user instructs to perform reference even if the reference requires payment of fee. In that case, the reference-allowed part contains a part, overlapping with the reference-requested portion, of which copyright management information represents a condition of "application required" or a condition of "pay". Incidentally, if the reference-requested portion does not contain the aforementioned part(s), the copyright management information check unit 8 communicates a message that the reference-allowed part does not exist to the document production unit 3.

If a decision result of step S121 is "YES", the copyright management information check unit 8 proceeds to step S123. Herein, the copyright management information check unit 8 communicates copyright management information to the document production unit 3, wherein the copyright management information contains pieces of information representing the reference-allowed part, the title of the reference-requested document and the name of the writer. Incidentally, the reference-allowed part is capable of including a part whose reference is allowed with display of copyright, other than the aforementioned part(s).

When receiving only the reference-allowed part from the copyright management information check unit 8, the document production unit 3 extracts the reference-allowed part from the document storage unit 4 so as to display it on the display device 2. This is made in step S29 shown in FIG. 5, which is activated when a decision result of step S28 is "NO". On the other hand, when receiving the reference-allowed part as well as the copyright information, the document production unit 3 extracts the reference-allowed part from the document storage unit 4 so as to display the reference-allowed part as well as the copyright information on the display device 2. This is made in step S30, which is activated when a decision result of step S28 is "YES". In the steps S29 and S30, if the reference-allowed part differs from the reference-requested portion, there occurs an event that a reference-incapable part exists. So, the document production unit 3 communicates such an event to the user by displaying it on the display device 2. In the case where an event that the reference-allowed part does not exist is communicated to the document production unit 3, the document production unit 3 displays such an event on the display device 2. Next, the document production unit 3 provides the user with an explanation regarding the copy (or insertion) of a part of the referred document into the document that the user is presently producing.

So, the user of the document production unit 3 inputs a copy request by the input device 1. Further, the user operates a cursor to designate a copied part that the user wishes to copy within the referred document.

When inputting the copy request from the input device 1, the document production unit 3 performs a copy process. This is made in step S5 shown in FIG. 4, which is activated when a decision result of step S4 is "YES".

In the copy process shown by the flowchart of FIG. 6, the document production unit 3 outputs a copy check request to the copyright management information check unit 8 in step S41. The copy check request contains pieces of information representing a document ID of a presently referred document, a copy-requested portion and a name of the user of the document production unit 3.

When receiving the copy check request from the document production unit 3, the copyright management information check unit 8 performs a copy process. This is made in step S104 shown in FIG. 10, which is activated when a decision result of step S103 is "YES".

Details of the copy process of step S104 is shown in FIGS. 12A and 12B. In step S131 shown in FIG. 12A, a decision is made as to whether of a writer of a copy-requested document coincides with the user of the document production unit 3 or not. When making a decision that the writer coincides with the user, the copyright management information check unit 8 communicates the copy-requested portion to the document production unit 3 as a copy-allowed part in step S132.

When receiving only the copy-allowed part from the copyright management information check unit 8, the document production unit 3 copies the full of the copy-allowed part into the document that the user is presently producing.

This is made in step S48 shown in FIG. 6, which is activated when both of decision results of steps S42 and S43 are "YES".

Meanwhile, when making a decision in step S131 shown in FIG. 12A that the writer differs from the user, the copyright management information check unit 8 proceeds to step S133. Herein, a decision is made as to whether a copy is allowed for the full of the copy-requested portion or not. This decision is made with reference to the stored content of the copyright management information storage unit 6. That is, the copyright management information check unit 8 makes a decision that the copy is allowed for the full of the copy-requested portion in the case where copyright management information set for a part overlapping with the copy-requested portion represents a condition of "full copy allowed" or a condition of "copy free". Incidentally, the unit 8 naturally determines that the copy is allowed with respect to a part of the copy-requested portion for which the copyright management information is not set.

If the copyright management information check unit 8 makes a decision in step S133 that the copy-requested portion conforms with the condition of "full copy allowed", it proceeds to step S134 shown in FIG. 12B. Herein, a decision is made as to whether the copy-requested portion contains a part to which a condition of "division disallowed" is designated.

If the copy-requested portion does not contain the part to which the condition of "division disallowed" is designated, in other words, if a decision result of step S134 is "NO", the copyright management information check unit 8 determines in step S135 that the copy-allowed part coincides with the copy-requested portion. Then, the copyright management information check unit 8 proceeds to step S149. In step S149, the unit 8 communicates copyright information as well as all pieces of copyright management information set for parts overlapping with the copy-allowed part to the document production unit 3. Herein, the copyright information contains pieces of information representing the copy-allowed part as well as a title and a writer of a copy-requested document. Incidentally, connection information is added to the copyright management information. The connection information represents a connection between the copyright management information and its corresponding part within the copy-allowed part.

If the copy-requested portion contains a division-disallowed part, in other words, if a decision result of step S134 is "YES", the copyright management information check unit 8 proceeds to step S136. So, the copyright management information check unit 8 determines a copy-allowed part such that the full of the division-disallowed part is copied. Then, the copyright management information check unit 8 communicates the "determined" copy-allowed part as well as copyright information and copyright management information to the document production unit 3 in step S149. As described before, the copyright management information contains connection information which represents a connection between the copyright information and its corresponding part within the copy-allowed part. Suppose a case where the stored content of the copyright management information storage unit 6 is shown in FIG. 3, wherein the copy-requested portion corresponds to a range of characters from characters 60 to character 70 in the document whose document ID is "2". In that case, the condition of "division disallowed" is designated in the range information 2. In step S136, the copyright management information check unit 8 determines a range of characters from character 53 to character 80 (containing sentence(s) and figure(s)) as the copy-allowed part, characters of which are renumbered as "character 1 to character 28". In next step S149, the copyright management information check unit 8 communicates the range of characters from character 53 to character 80 to the document production unit 3 as the copy-allowed part. In addition, it communicates copyright management information, representing the title of the document "OCR Text Search System Using Redundancy Index" and the name of the writer "Kenji Sato", to the document production unit 3. Further, it communicates copyright management information, defined in the range information 2, and connection information to the document production unit 3. Herein, the copyright management information represents conditions of "reference allowed", "copy allowed", "print allowed" and "division disallowed", while the connection information provides representation that the above copyright management information is connected with the copy-allowed part consisting of characters ranging from character 1 to character 28.

As a result, the copyright management information check unit 8 supplies the document production unit 3 with the copy-allowed part, copyright information and copyright management information to which the connection information is added. In FIG. 6, a decision result of step S42 is "YES", a decision result of step S43 is "NO", and a decision result of step S49 is "NO". Thus, the document production unit 3 proceeds to step S50, wherein the copy-allowed part is copied onto the document that is presently producing. In step 852, the document production unit 3 saves the copyright information and copyright management information, supplied thereto, in connection with a copy location at which the copy-allowed part is copied.

If a decision result of step S133 shown in FIG. 12A is "NO", the copyright management information check unit 8 proceeds to step S137, wherein a decision is made as to whether the copy-requested portion contains a pay part.

When making a decision that the copy-requested portion contains a pay part, the copyright management information check unit 8 proceeds to step S138. Herein, an inquiry is given as to whether the user wishes to perform copy with payment of fee or not. In step 8138, a decision is made as to whether such an inquiry is given with respect to the copy-requested document in a duration between the start of the system and the present timing. When making a decision that such an inquiry is not given, the copyright management information check unit 8 proceeds to step S139. Herein, the copyright management information check unit 8 gives an inquiry whether to perform copy with the payment of fee to the document production unit 3, then, it waits for a reply from the document production unit 3.

When receiving an inquiry whether to perform copy with the payment of fee from the copyright management information check unit 8, the document production unit 3 displays it on the display device 2. Then, the document production unit 3 sends back a reply, corresponding to an instruction of the user, to the copyright management information check unit 8. This is made in step S45 shown in FIG. 6, which is activated when a decision result of step S44 is "YES".

When receiving the reply from the document production unit 3, the copyright management information check unit 8 retains its content therein (see step S139 in FIG. 12A). The copyright management information cheek unit 8 proceeds to step S140 when a decision result of step S137 is "NO", when a decision result of step S138 is "YES", or when the step S139 is completed. In step S140, a decision is made as to whether the copy-requested portion contains an application-required part or not. This decision is made based on the stored content of the copyright management information storage unit 6.

If a decision result of step S140 is "YES", the copyright management information check unit 8 proceeds to step S141. Herein, the unit 8 refers to the copyright management information storage unit 6 to make a decision as to whether the user of the document production unit 3 coincides with an application-filed user who filed an application.

When making a decision in step S141 that the user does not coincide with the application-filed user, the copyright management information check unit 8 proceeds to step S142, wherein a decision is made as to whether a communication of an application-requirement message, that an application is required for the copy, is made with respect to the copy-requested document in a duration between the start of the system and the present timing or not. If such an application-requirement message has not been communicated yet, the copyright management information check unit 8 communicates with the document production unit 3 to inform of a message that an application is required for the copy in step S143.

When receiving such an application-requirement message from the copyright management information check unit 8, the document production unit 3 displays it on the display device 2 go as to inform the user of it. This is made in step S47 shown in FIG. 6, which is activated when a decision result of step S46 is "YES".

The copyright management information check unit 8 proceeds to step S144 when a decision result of step S140 is "NO", when a decision result of step S141 is "YES", when a decision result of step S142 is "YES", or when the step S143 is completed.

In step S144 shown in FIG. 12B, a decision is made as to whether the copy-requested portion contains a division-disallowed part to which a condition of "division disallowed" is designated or not. If the copy-requested portion does not contain the division-disallowed part, the copyright management information check unit 8 proceeds to step S145, wherein the copy-allowed part is determined in consideration of the pay part and application-required part. If the copy-requested portion contains the division-disallowed part, the copyright management information check unit 8 proceeds to step S146, wherein the copy-allowed part is determined in consideration of the division-disallowed part, pay part and application-required part.

In step S147, a decision is made as to whether the copy-requested portion contains a copyright-display-required part that requires a display of copyright for the copy or not.

If a decision result of step S147 is "NO", the copyright management information check unit 8 proceeds to step S149. Herein, the copyright management information check unit 8 supplies the document production unit 3 with the copy-allowed part and copyright information (i.e., the title of the document and the name of the writer) set for the copy-requested document as well as the full of the copyright management information which is set to a part overlapping with the copy-requested portion, wherein the connection information is added to the copyright management information. Incidentally, if the copy-requested portion does not contain the copy-allowed part, the copyright management information check unit 8 communicates a message that no copy-allowed part exists to the document production unit 3.

If a decision result of step S147 is "YES", the copyright management information check unit 8 proceeds to step S148 so as to supply the document production unit 3 with an instruction to display the copyright (hereinafter, referred to as a copyright display instruction) in addition to the copy-allowed part, copyright information of the copied document, and the full of the copyright management information (added with the connection information) set for a part overlapping with the copy-requested portion.

When receiving the copy-allowed part, copyright information and copyright management information from the copyright management information check unit 8 without receiving the copyright display instruction, the document production unit 3 proceeds to steps S50 and S52 (see FIG. 6) via step S49 whose decision result is "NO". Herein, the document production unit 3 copies the copy-allowed part onto the document that is presently producing; thereafter, it retains the copyright information and copyright management information in connection with a copy location for a, part that is connected with the copyright management information therein. On the other hand, if the document production unit 3 receives the copyright display instruction in addition to the above, the document production unit 3 proceeds to steps S51 and S52 via step S49 whose decision result is "YES". Herein, the document production unit 3 copies the copy-allowed part onto the document that is presently producing and also copies the copyright information onto its corresponding part of the document that is presently producing. Further, the document production unit 3 retains the copyright information and copyright management information in connection with a copy location for a part which is connected with the copyright management information therein. In steps S50 and S51, if the copy-allowed part differs from the copy-requested portion, there occurs an event that a copy-disallowed part exists in the copy-requested portion. So, the document production unit 3 displays such an event on the display device 2 so as to inform the user of the event. If the copyright management information check unit 8 communicates a message that the copy-allowed part does not exist to the document production unit 3, the document production unit 3 displays such a message on the display device 2 in step S50. In addition, the display device 2 displays the "communicated" copyright as well. In some case, by the copy of a certain document onto the document that is presently producing in step S48, S50 or S51, there occurs a change in connecting relationship between the copyright information and copyright management information and the copy location for the part which is connected with the copyright management information. In that case, the document production unit 3 corrects the copy location.

Next, a description will be given with respect to a print process that the user of the document production unit 3 performs print of a part of the referred document.

The user of the document production unit 3 inputs a print request by the input device 1. Further, the user designates a print-requested portion of the referred document by operating a cursor.

When inputting the print request from the input device 1, the document production unit 3 proceeds with a print process in step S7 via step S6 whose decision result is "YES".

Details of the print process of step S7 is shown in FIG. 7. In step S61 shown in FIG. 7, the document production unit 3 outputs a print check request to the copyright management information check unit 8. The print check request contains pieces of information representing a document ID of a print-requested document, a print-requested portion and a name of a user of the document production unit 3.

When receiving the print check request from the document production unit 3, the copyright management information check unit 8 performs a print check process. This is made in step S106 shown in FIG. 10, which is activated when a decision result of step S105 is "YES".

Details of the print check process of step S106 is shown in FIGS. 13A and 13B. In step S150 shown in FIG. 13A, a decision is made as to whether a writer of the print-requested document coincides with the user of the document production unit 3 or not. If the copyright management information check unit 8 makes a decision that the writer coincides with the user, it proceeds to step S151, wherein it communicates a print permission to the document production unit 3.

When receiving the print permission from the copyright management information check unit 8, the document production unit 3 performs print of the print-requested portion of the print-requested document by using the print device 9. This is made in step S63 shown in FIG. 7, which is activated when a decision result of step S62 is "YES".

If the copyright management information check unit 8 makes a decision that the writer of the print-requested document differs from the user of the document production unit 3, in other words, if a decision result of step S150 shown in FIG. 13A is "NO", the copyright management information check unit 8 proceeds to step S152, wherein a decision is made as to whether a print is allowed with respect to the full of the print-requested portion or not. Herein, the decision is made with reference to the stored content of the copyright management information storage unit 6. Incidentally, if the copyright management information is not set for a part overlapping with the print-requested portion, or if a condition of "print free" is designated to such a part, the copyright management information check unit 8 determines that the print is allowed.

When making a decision that the print is allowed for the full of the print-requested portion in step S152, the copyright management information check unit 8 proceeds to step S151 so that a print permission is communicated to the document production unit 3. On the other hand, if a decision result of step S152 is "NO", the copyright management information check unit 8 proceeds to step S153, wherein a decision is made as to whether the print-requested portion contains a pay part or not.

If the copyright management information check unit 8 makes a decision that the print-requested portion contains the pay part, it proceeds to step S154. Herein, an inquiry is given as to whether the user wishes to perform print with payment of fee or not. In step S154, a decision is made as to whether such an inquiry is given with respect to the print-requested document in a duration between the start of the system and the present timing or not. If the copyright management information check unit 8 makes a decision that such an inquiry has not been given yet, it proceeds to step S155. Herein, the copyright management information check unit 8 communicates with the document production unit 3 to give an inquiry whether to perform print with the payment of fee. Then, the unit 8 waits for a reply from the document production unit 3.

When receiving an inquiry whether to perform print with the payment of fee, the document production unit 3 displays it on the display device 2 so as to send back a reply, corresponding to an instruction of the user, to the copyright management information check unit 8. This is made in step S65 shown in FIG. 7, which is activated when a decision result of step S64 is "YES".

When receiving the reply from the document production unit 3, the copyright management information check unit 8 retains the content of the reply therein in step S155 shown in FIG. 13A.

The copyright management information check unit 8 proceeds to step S156 when a decision result of step S153 is "NO", when a decision result of step S154 is "YES", or when the step S155 is completed. In step S156 shown in FIG. 13B, a decision is made as to whether the print-requested portion contains an application-required part, which requires to file an application for the print, or not. This decision is made based on the stored content of the copyright management information storage unit 6.

If a decision result of step S156 is "YES", the copyright management information check unit 8 proceeds to step 8157. Herein, a decision is made as to whether the user of the document production unit 3 coincides with an application-filed user who has already filed an application for the copy. This decision is made with reference to the stored content of the copyright management information storage unit 6.

If the copyright management information check unit 8 makes a decision in step S157 that the user does not coincide with the application-filed user, it proceeds to step S158, wherein a decision is made as to whether an application-requirement message that an application is required for the print has been already communicated with respect to the print-requested document in a duration between the start of the system and the present timing or not. If such an application-requirement message is not communicated to the document production unit 3, the copyright management information check unit 8 proceeds to step S159. Herein, the copyright management information check unit 8 communicates an application-requirement message that an application is required for the print to the document production unit 3.

When receiving the application-requirement message from the copyright management information check unit 8, the document production unit 3 displays it on the display device 2 so as to inform the user of it. This is made in step S67 shown in FIG. 7, which is activated when a decision result of step S66 is "YES".

The copyright management information check unit 8 proceeds to step S160 when a decision result of step S156 is "NO", when a decision result of step S157 is "YES", when a decision result of step S158 is "YES", or when the step S159 is completed.

In step S160, a decision is made as to whether the print-requested portion contains a copyright-display-required part that requires a display of copyright for print or not.

If a decision result of step S160 is "NO", the copyright management information check unit 8 proceeds to step S162. Herein, the copyright management information check unit 8 determines a print-allowed part whose print is allowed within the print-requested portion on the basis of the stored content of the copyright management information storage unit 6. So, the unit 8 communicates the print-allowed part to the document production unit 3. Incidentally, the print-allowed part contains a part, which overlaps with the print-requested portion and whose copyright management information designates a condition of "print allowed" or a condition of "print free". In the case where the an application is completely filed while the user agrees to perform reference with the payment of fee, the print-allowed part contains a part, which overlaps with the print-requested portion and whose copyright management information designates a condition of "application required" or a condition of "pay". By the way, if the print-requested portion contains the aforementioned part(s), the copyright management information check unit 8 communicates a message that the print-allowed part does not exist to the document production unit 3.

If a decision result of step S160 is "YES", the copyright management information check unit 8 proceeds to step S161, wherein it communicates the print-allowed part and the copyright information of the printed document to the document production unit 3. Herein, the print-allowed part contains a part for which a print is allowed with a display of copyright, other than the aforementioned part(s).

When receiving only the print-allowed part from the copyright management information check unit 8, the document production unit 3 performs print of the print-allowed part using the print device 9. This is made in step S69 shown in FIG. 7, which is activated when a decision result of step S68 is "NO". On the other hand, when receiving the print-allowed part as well as the copyright information, the document production unit 3 performs print of the print-allowed part and copyright information using the print device 9. This is made in step S70, which is activated when a decision result of step S68 is "YES". In steps S69 and S70, if the print-allowed part differs from the print-requested portion, there occurs an event that a print-incapable part exists, so the document production unit 3 displays such an event on the display device 2. If the document production unit 3 is informed of an event that the print-allowed part does not exist, it displays such an event on the display device 2 in step S69.

Next, a description will be given with respect to operations of the system that are performed when the user of the document production unit 3 performs editing (insertion, deletion, etc.) on the document that is presently producing.

Using a cursor or else, the user of the document production unit 3 designates an edited part that is subjected to editing. In addition, the user inputs an edit request, containing content of editing, by the input device 1.

When inputting the edit request, the document production unit 3 performs an edit process in step S9 shown in FIG. 4, which is activated when a decision result of step S8 is "YES".

Details of the edit process in step S9 shown in FIG. 4 is shown in FIG. 8. In step S81, a decision is made as to whether an edited part which is subjected to editing coincides with a copied part of the referred document as well as a division-disallowed part to which a condition of "division disallowed" is designated within the referred document or not. This decision is made based on the content of information that is stored in the aforementioned step S52 shown in FIG. 6. If the document production unit 3 makes a decision that the edited part coincides with the division-disallowed part, it proceeds to step S83 to perform processing in accordance with an edit request. In step S84, the document production unit 3 corrects the copy location, which is stored in the aforementioned step S52.

Next, a description will be given with respect to the operation to set copyright management information, which is set with respect to the document that is produced by the document production unit 3 and is saved in the document storage unit 4.

When completing production of the document, the user of the document production unit 3 inputs a completion instruction by the input device 1.

When inputting the completion instruction, the document production unit 3 saves the produced document in the document storage unit 4. This is made in step S11 shown in FIG. 4, which is activated when a decision result of step S10 is "YES". Then, the document production unit 3 proceeds to step S12, wherein it starts the copyright management information setting unit 5. So, the document production unit 3 communicates the document ID and title of the saved document as well as the name of the writer to the copyright management information setting unit 5. In addition, the document production unit 3 communicates a completion instruction to the copyright management information check unit 8.

When receiving the completion instruction so that a decision result of step S10 is "YES", the copyright management information check unit 8 completes the processing thereof.

When being started by the document production unit 3, the copyright management information setting unit 5 performs processing corresponding to the flowchart of FIG. 9.

In step S90, the copyright management information setting unit 5 stores the document ID and title of the document as well as the name of the writer, which are communicated thereto from the document production unit 3, in the copyright management information storage unit 6. In step S91, examination is performed, using the copyright management information insertion unit 5a, as to whether the document saved in the document storage unit 4 contains a copied part of the referred document or not. That is, in the copyright management information insertion unit 5a, a decision as to whether the saved document contains the copied part of the referred document or not is performed by a decision as to whether the document production unit 3 stores a connecting relationship between the copyright management information and copy location, which are connected with each other, or not.

When the copyright management information insertion unit 5a makes a decision that the saved document contains the copied part, the copyright management information setting unit 5 proceeds to step S92, wherein range information consisting of a pair of copyright management information and copy location is produced with respect to each of multiple sets of copyright management information saved in the document production unit 3. So, the "produced" range information is stored in the copyright management information storage unit 6 in connection with the document ID and title of the document as well as the name of the writer, which are stored in the aforementioned step S90. Then, the copyright management information setting unit 5 proceeds to step S94 via step S93. In step S94, the copyright management information setting unit 5 displays the document, to which the copyright management information is set, on the display device 2 while setting the copyright management information in a dialogue manner. That is, the user operates a cursor to designate a set range for the copyright management information while designating a content of the copyright management information. When the set range and content of the copyright management information are designated so that a decision result of step S93 is "YES", the copyright management information setting unit 5 proceeds to step S94 to produce range information which contains the designated set range and the designated content of the copyright management information. So, the produced range information is stored in the copyright management information storage unit 6 in connection with the document ID and title of the document as well as the name of the writer, which are stored in the aforementioned step S90. Incidentally, when forcing the user to designate the content of the copyright management information, the copyright management information setting unit 5 displays a table as shown in FIG. 2 on the display device 2, so that the user is capable of designating the content of the copyright management information on the screen of the display device 2. When completing such a setting process, the user inputs a completion instruction by the input device 1, so that a decision result of step S95 is "YES". Thus, the copyright management information setting unit 5 completes the processing thereof.

Figure 14:
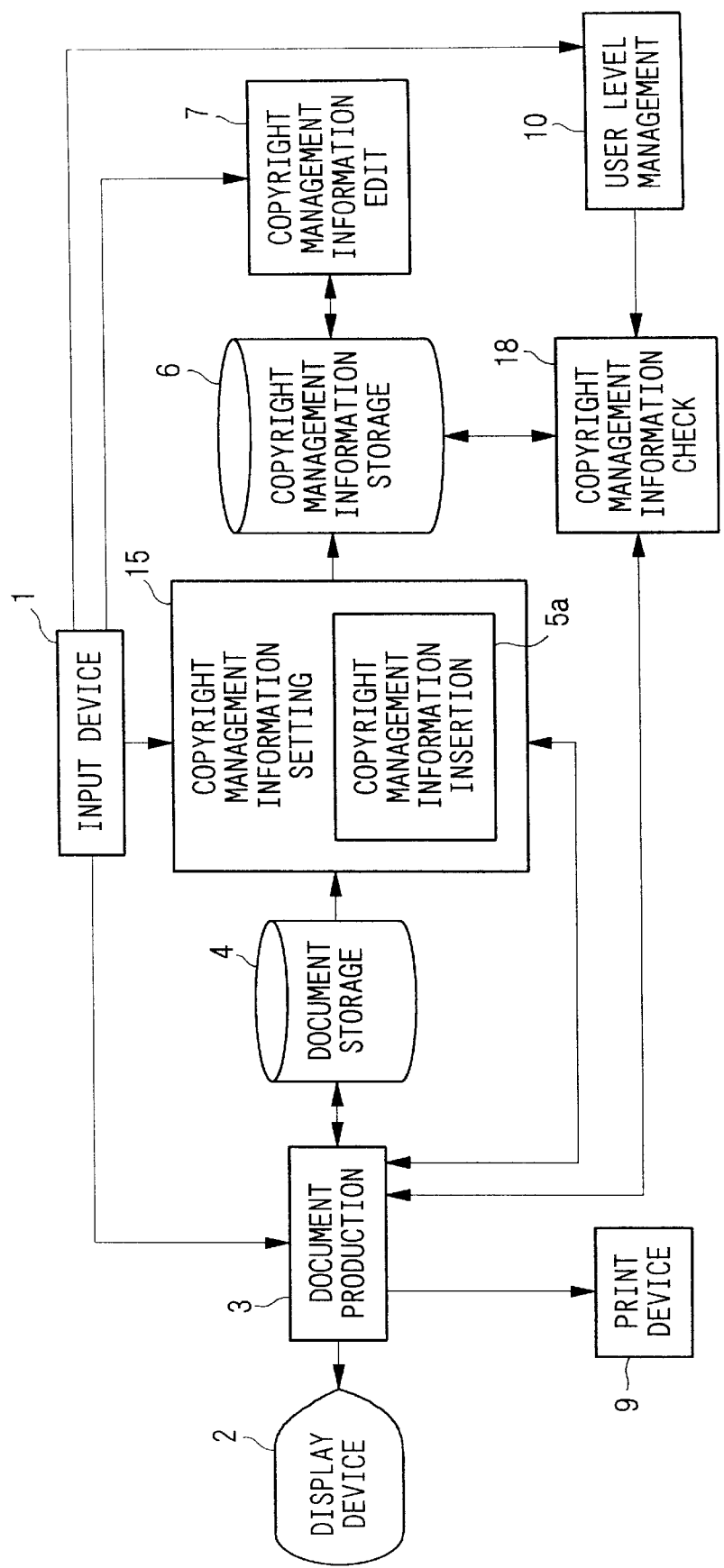
FIG. 14 is a block diagram showing a second example of the document management system in accordance with this invention.

FIG. 14 is a block diagram showing a second example of the document management system in accordance with this invention. As compared with the configuration of the document management system shown in FIG. 1, the document management system of FIG. 14 is characterized by newly providing a user level management unit 10 while replacing the aforementioned units 5 and 8 with a copyright management information setting unit 15 and a copyright management information check unit 18 respectively.

The user level management unit 10 has a function to produce a user level of a user of the document production unit 3 based on user information (e.g., user ID). Herein, the user level corresponds to a duty level, which is set in response to a position of office such as a section chief or a department director and which is used in a company by an intra net, for example.

The copyright management information setting unit 15 has functions that are roughly identical to those of the aforementioned copyright management information setting unit 5. Different from the aforementioned unit 5, the copyright management information setting unit 15 is capable of setting multiple sets of copyright management information for multiple user levels with respect to a single unit for setting the copyright management information.

The copyright management information check unit 18 has functions that are roughly identical to those of the aforementioned copyright management information check unit 8. Different from the aforementioned unit 8, the copyright management information check unit 18 is capable of performing processes shown in FIGS. 11A, 11B, FIGS. 12A, 12B and FIGS. 13A, 13B by using the copyright management information corresponding to the user level, that is detected by the user level management unit 10, within the multiple sets of the copyright management information which are stored in the copyright management information storage unit 6 in response to the multiple user levels respectively.

Next, operations of the document management system of FIG. 14 will be described in detail.

At first, when the user produces a document using the document production unit 3, the user inputs his or her user information such as a user ID by the input device 1.

When inputting the user information, the user level management unit 10 starts a process shown in FIG. 15. In step S171, the user level management unit 10 detects a user level of the user. In step S172, it communicates the user level to the copyright management information check unit 18.

When receiving a check request such as a reference check request, a copy check request and a print check request from the document production unit 3, the copyright management information check unit 18 extracts copyright management information, corresponding to the user level detected by the user level management unit 10, from among copyright management information set for a part overlapping with a check-requested portion of a check-requested document. Using the extracted copyright management information, the copyright management information check unit 18 performs processes similar to the processes of the aforementioned copyright management information check unit 8.

Now, suppose a case where content of the copyright management information storage unit 6 is shown in FIG. 16 while the user of the document production unit 3 has a user level corresponding to a section chief, so that the user gives a print request with respect to a print-requested range corresponding to a range of characters between character 1 and character 52 in a document whose document ID is "2".

When being given such a print request, the document production unit 3 communicates it to the copyright management information check unit 18.

In this case, the user level management unit 10 has already communicated the copyright management information check unit 18 that the user level of the user corresponds to the section chief. In FIG. 16, three sets of copyright management information corresponding to three user levels respectively are set in range information 1 of the document whose document ID is "2". So, the copyright management information corresponding to the section chief is selected and is used to perform a decision as to whether a print is allowed or not. The selected copyright management information contains a condition of "print allowed". Thus, the copyright management information check unit 18 makes a decision that the print is allowed.

As described above, the document management system of FIG. 14 is capable of performing copyright management in response to the user level(s). So, as compared with the aforementioned system of FIG. 1, the system of FIG. 14 is capable of performing fine copyright management.

Figure 17:
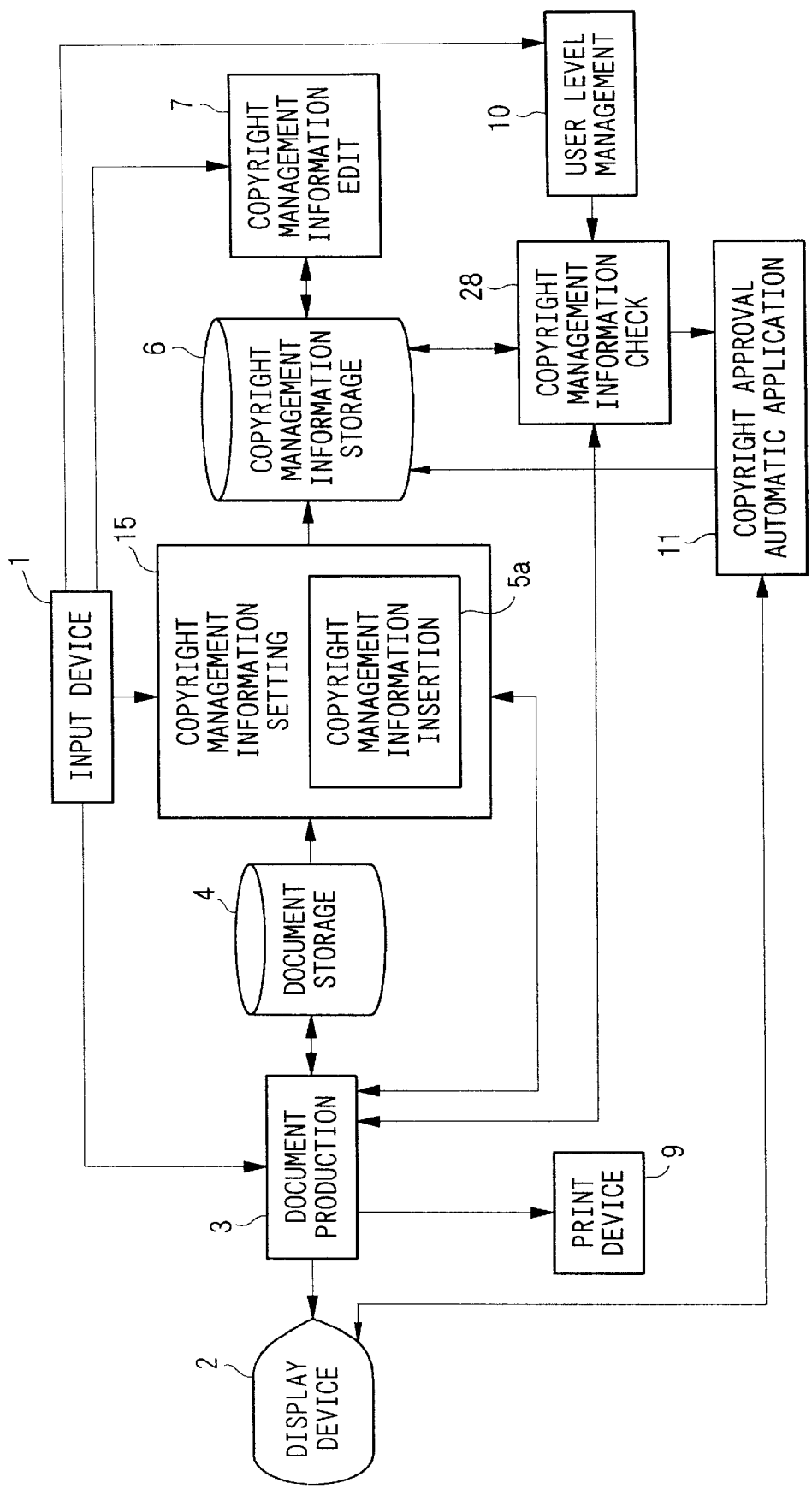
FIG. 17 is a block diagram showing a third example of the document management system in accordance with this invention.

FIG. 17 is a block diagram showing a third example of the document management system in accordance with this invention. As compared with the document management system of FIG. 14, the document management system of FIG. 17 is characterized by providing a copyright approval automatic application unit 11 while replacing the copyright management information check unit 18 with a copyright management information check unit 28.

The copyright approval automatic application unit 11 has a function to perform an application process when a certain portion of a use-requested document that a user of the document production unit 3 requests to use contains an application-required part that requires an application to be filed for the use.

The copyright management information check unit 28 has roughly same functions of the copyright management information check unit 18. Different from the copyright management information check unit 18, the copyright management information check unit 28 controls the copyright approval automatic application unit 11 to perform an application process when a certain portion of the use-requested document that the user of the document production unit 3 requests to use contains an application required part that requires an application for the use and when an application has not been filed for the use.

Next, operations of the document management system of FIG. 17 will be described in detail.

In the case where a certain portion of the use-requested document that the user of the document production unit 3 requests to use contains an application-required part but the user has not been filed an application for approval of copyright, the document management system starts the copyright approval automatic application unit 11.

Figure 18:
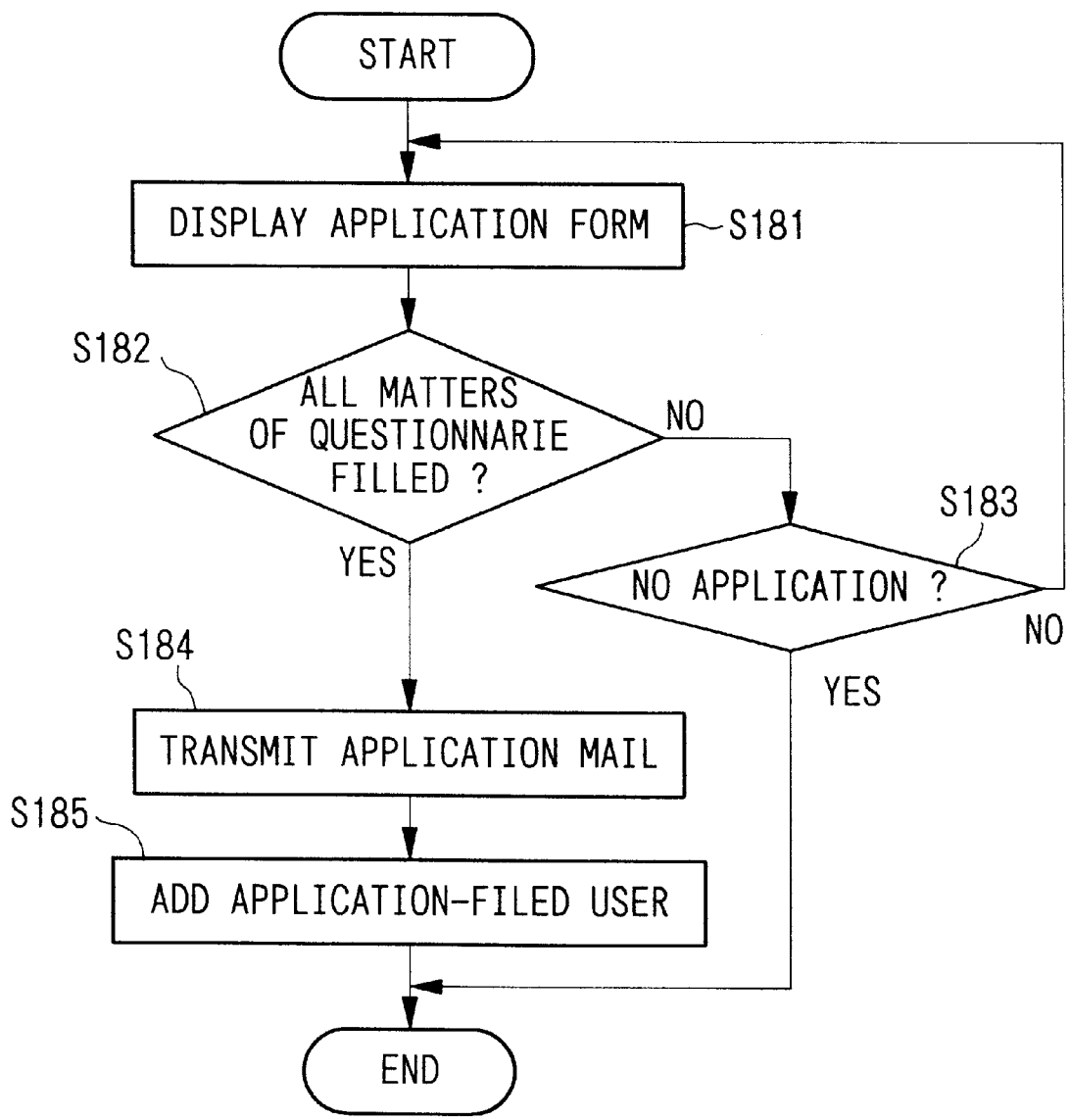
FIG. 18 is a flowchart showing an example of an application process performed by a copyright approval automatic application unit shown in FIG. 17.

Thus, the copyright approval automatic application unit 11 performs an application process, an example of which is shown in FIG. 18. In step S181, the copyright approval automatic application unit 11 controls the display device 2 to display a prescribed application form on the screen. If the user of the document production unit 3 wishes to use the application-required part, the user fills a questionnaire with appropriate information required for the application such as a name of the user. If the user does not wish to use the application-required part, the user communicates the copyright approval automatic application unit 11 with a message that the user does not file an application.

When being communicated with the message that the user does not file an application, the copyright approval automatic application unit 11 turns a decision result of step S183 to "YES" so as to transfer control to the copyright management information check unit 28. If the user fills matters written on the application form with appropriate pieces of information, a decision result of step S182 turns to "YES", so that the copyright approval automatic application unit 11 proceeds to step S184. Herein, the copyright approval automatic application unit 11 transmits an application mail to a copyright holder or an agent. In next step S185, the copyright approval automatic application unit 11 adds a user ID of the user to an item of "application-filed user" on the table stored in the copyright management information storage unit 6. Then, the copyright approval automatic application unit 11 transfers control to the copyright management information check unit 28.

In response to a transfer of control from the copyright approval automatic application unit 11, the copyright management information check unit 8 checks the item of "application-filed user". In response to a check result, the copyright management information check unit 28 performs processes similar to those of the aforementioned copyright management information check unit 8.

In the above, the step S184 is designed to transmit the application mail to the copyright holder or agent. However, it is possible to modify the step S184 as follows:

The copyright approval automatic application unit 11 performs an accumulation process to merely accumulate contents of application forms whose matters are filled with appropriate pieces of information. Afterwards, a manager of the system attends to filing of applications based on the "accumulated" application forms.

In the case of the application process of FIG. 18, the user fills the matters of the application form by himself or herself. However, if appropriate pieces of information have been already input to the system, the copyright approval automatic application unit 11 is modified to automatically fill the matters of the application form with the "input" information.

According to the document management system of FIG. 17, the copyright approval automatic application unit 11 is provided to perform the application process. So, it is possible to reduce the load to the user.

Figure 19:
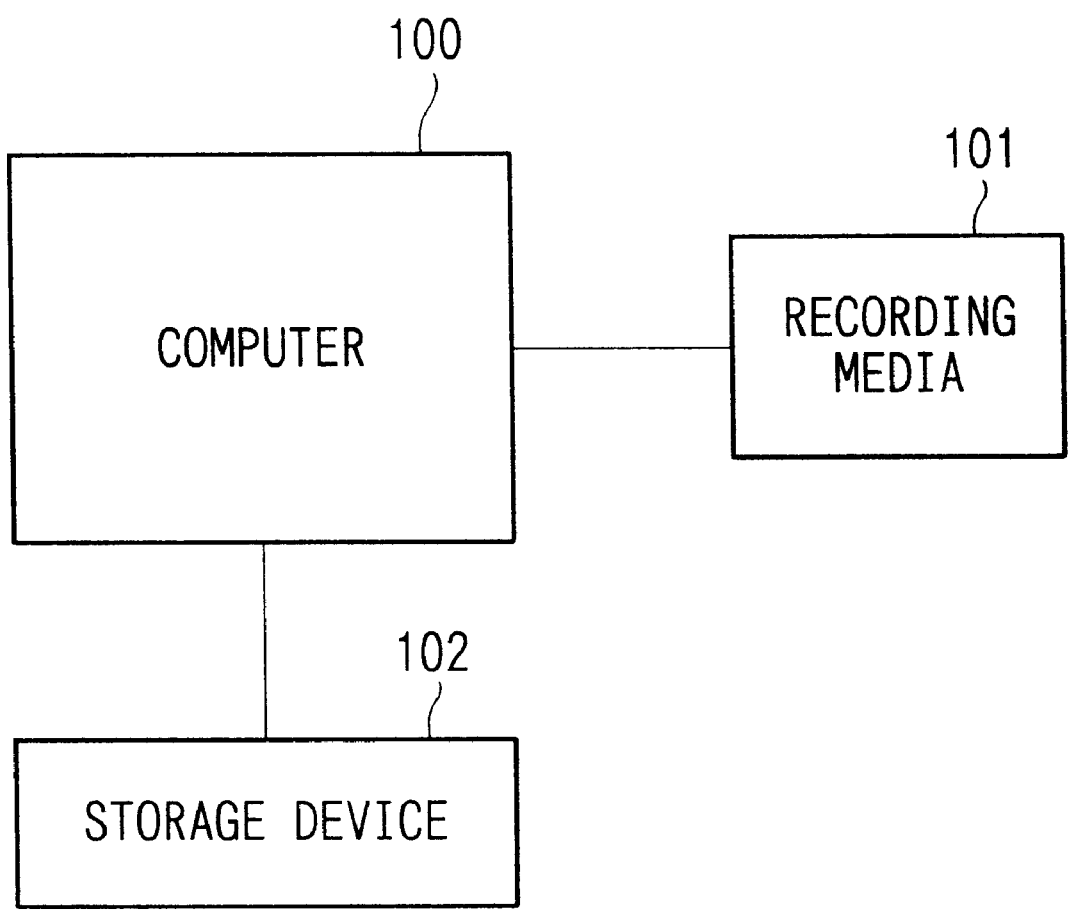
FIG. 19 is a block diagram showing an example of a hardware configuration of the document management system.

FIG. 19 is a block diagram showing a hardware configuration of the document management system, which is configured by a computer 100, a recording media 101 and a storage device 102.

The recording media 101 records a document management program. The recording media 101 corresponds to a magnetic disk, a semiconductor memory or other recording media.

The computer 100 loads the document management program recorded on the recording media 101. By being controlled by the document management program, functions of the aforementioned units shown in FIG. 1 such as the document production unit 3, copyright management information setting unit 5, copyright management information edit unit 7, copyright management information check unit 8 are actualized on the computer 100. In addition, functions of the document production unit 4 and copyright management information storage unit 6 are actualized on the storage device 102.

As this invention may be embodied in several forms without departing from the spirit of essential characteristics thereof, examples of this invention are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A document management method comprising the steps of:

storing a document that is produced be a document production means in a document storage means;

setting copyright management information with respect to a constituent element of the document stored in the document storage means, so that the copyright management information is stored in a copyright management information storage means in connection with information representing the constituent element to which the copyright management information is set;

determining a use-allowed part within a prescribed portion of another document that is stored in the document storage means and whose use is requested while the document production means produces the document, wherein the use-allowed part is determined based on the copyright management information of the constituent element that overlaps with the prescribed portion;

incorporating the use-allowed part of said another document into the document;

performing an application process to file an application for approval of use with respect to a constituent element of said another document that requires the application for the use and that overlaps with the prescribed portion that the document production means requests to use; and incorporating the constituent element into the document if said approval is granted.

2. A document management system comprising:

document storage means;

document production means for producing a document, which is stored in the document storage means;

copyright management information storage means;

copyright management information setting means for setting copyright management information with respect to a constituent element of the document that is produced by the document production means, so that the copyright management information is stored in the copyright management information storage means in connection with information representing the constituent element to which the copyright management information is set;

copyright management information check means for determining a use-allowed part within a prescribed portion of another document that is stored in the document storage means and whose use is requested while the document production means produces the document, wherein the use-allowed part is determined based on the copyright management information of the constituent element overlapping with the prescribed portion;

means to incorporate the use-allowed part of said another document into the document;

copyright approval automatic application means for performing an application process to file an application for approval of use with respect to a constituent element that requires an application for use and that overlaps with the prescribed portion whose use is requested by the document production means; and means to incorporate the constituent element into the document if said approval is granted.

3. A document management system comprising:

document production means for producing a document;

document storage means for storing documents, which include the document that is produced by the document production means;

copyright management information setting means for setting copyright management information with respect to a least a constituent element of the document, wherein the copyright management information is provided to manage copyright information with respect to the document;

copyright management information storage means for storing the copyright management information;

determination means for determining a use-allowed part, to which an approval of use is given, within a prescribed portion of a use-requested document that is stored in the document storage means in advance and whose use is requested while the document production means produces the document, wherein the use-allowed part is determined based on the copyright management information of the constituent element overlapping with the prescribed portion;

means to incorporate the use-allowed part of said use-requested document into the document;

decision means for making a decision whether to use the prescribed portion that includes an application-required part that requires an application to be filed for use; and means to incorporate the prescribed portion into the document if said decision is made.

4. A document management system comprising:

document production means for producing a document;

document storage means for storing documents, which include the document that is produced by the document production means copyright management information setting means for setting copyright management information with respect to a least a constituent element of the document, wherein the copyright management information is provided to manage copyright information with respect to the document;

copyright management information storage means for storing the copyright management information;

determination means for determining a use-allowed part, to which an approval of use is given, within a prescribed portion of a use-requested document that is stored in the document storage means in advance and whose use is requested while the document production means produces the document, wherein the use-allowed part is determined based on the copyright management information of the constituent element overlapping with the prescribed portion;

means to incorporate the use-allowed part of said use-requested document into the document;

means for filing an application for the approval of use with respect to the prescribed portion; and means to incorporate the prescribed portion into the document if said approval is given.

5. A document management method comprising the steps of:

storing a document that is produced by a document production means in a document storage means;

setting multiple sets of copyright management information in response to user levels respectively with respect to a constituent element of the document that is stored in the document storage means, so that the multiple sets of copyright management information are stored in a copyright management information storage means in connection with information representing constituent element to which the copyright management information is set;

detecting a user level of a user who uses the document production means to produce the document by a user level management means;

determining a use-allowed part within a prescribed portion of another document that is stored in the document storage means and whose use is requested while the document production means produces the document, wherein the use-allowed part is determined based on the copyright management information, corresponding to the user level that is detected by the user level management means, within the multiple sets of copyright management information that are set with respect to the constituent element overlapping with the prescribed portion;

incorporating the use-allowed part of said another document into the document;

performing an application process to file an application for approval of use with respect to a constituent element of said another document that requires the application for the use and that overlaps with the prescribed portion that the document production means requests to use;

incorporating the constituent element into the document if said approval is granted.

6. A document management system comprising:

document storage means;

document production means for producing a document, which is stored in the document storage means;

copyright management information storage means;

copyright management information setting means for setting multiple sets of copyright management information in response to user levels respectively with respect to a constituent element of the document that is produced by the document production means, so that the multiple sets of copyright management information are stored in the copyright management information storage means in connection with information representing the constituent element to which the copyright management information is set;

user level management means for detecting a user level of a user who uses the document production means to produce the document;

copyright management information check means for determining a use-allowed part within a prescribed portion of another document that is stored in the document storage means and whose use is requested while the document production means produces the document, wherein the use-allowed part is determined based on the copyright management information, corresponding to the user level that is detected by the user level management means, within the multiple sets of copyright management information that are stored in the copyright management information storage means with respect to the constituent element overlapping with the prescribed portion;

means to incorporate the use-allowed part of said another document into the document;

copyright approval automatic application means for performing an application process to file an application for approval of use with respect to a constituent element that requires an application for use and that overlaps with the prescribed portion whose use is requested by the document production means; and means to incorporate the constituent element into the document if said approval is granted.

* * * * *